United States Patent
Katayama et al.

(10) Patent No.: US 6,483,653 B1
(45) Date of Patent: Nov. 19, 2002

(54) MAGNETIC RECORDING MEDIUM AND MAGNETIC REPRODUCING METHOD

(75) Inventors: Hiroyuki Katayama, Nara (JP); Shinzo Sawamura, Nishinomiya (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/441,704

(22) Filed: Nov. 16, 1999

(30) Foreign Application Priority Data

Nov. 16, 1998 (JP) .......................................... 10-325615

(51) Int. Cl.⁷ ................................................ G11B 5/02
(52) U.S. Cl. .......................................... 360/59; 428/694
(58) Field of Search ............................. 360/59; 428/694

(56) References Cited

FOREIGN PATENT DOCUMENTS

| JP | 2617025 | 3/1997 |
| JP | 2636957 | 4/1997 |

Primary Examiner—David Hudspeth
Assistant Examiner—Mitchell Slavitt
(74) Attorney, Agent, or Firm—Dike, Bronstein, Roberts & Cushman; David G. Conlin

(57) ABSTRACT

A magnetic layer includes a first magnetic film and a second magnetic film which are coupled to each other by means of exchanged coupling of magnetic materials, and one of the magnetic films is made of a ferrimagnetic material having a magnetic compensation temperature. When information is reproduced by heating a magnetic reproducing track portion to a magnetically reproducible temperature by a light beam, the magnetization directions of the two magnetic films are opposite in a peripheral track portion having approximately room temperature, and the same in the magnetic reproducing track portion heated to the magnetically reproducible temperature. Consequently, crosstalk from the peripheral track portion is reduced, and a reproducing signal from the magnetic reproducing track portion is increased, thereby improving the S/N of the reproducing signal significantly. Consequently, it has become possible to provide a magnetic recording medium which can realize high-density recording and reproducing with less crosstalk while producing a reproducing signal with excellent S/N.

30 Claims, 14 Drawing Sheets

↑ Sublattice magnetization of transition metals

⇧ Total magnetization

⇧ ⇩ Magnetization

MAGNETIC RECORDING MEDIUM AND MAGNETIC REPRODUCING METHOD

FIELD OF THE INVENTION

The present invention relates to a high-density reproducible magnetic recording medium which records and reproduces information magnetically with heating, and a magnetic reproducing method thereof.

BACKGROUND OF THE INVENTION

Recently, there has been an increasing need for a memory device with a larger capacity to process multimedia information in a broad bandwidth. Among of all, high-density recording and reproducing techniques have been developed actively with rewritable optical disks, magnetic disks, and magnetic tapes.

One of the proposed techniques realizes high-density recording and reproduction by narrowing a track during the magnetic recording and reproduction by means of assist irradiation of light (which is referred to as light assist type magnetic recording and reproducing method, hereinafter).

Incidentally, one of the problems in realizing the high-density recording and reproduction is how crosstalk from a recording bit (hereinafter, referred to as adjacent bit) adjacent to a reproducing bit should be suppressed.

Accordingly, a light assist type magnetic recording and reproducing method which can reduce crosstalk from the adjacent bit is disclosed, for example, in Japanese Patent No. 2617025 issued on Jun. 4, 1997 (corresponding to Japanese Laid-open Patent Application No. 176034/1992 (Japanese Official Gazette, Tokukaihei No. 4-176034, published on Jun. 23, 1992)), which is referred to as the first light assist type magnetic recording and reproducing method, hereinafter. Another light assist type magnetic recording and reproducing method which can also reduce crosstalk from the adjacent bit is disclosed, for example, in Japanese Patent No. 2636957 issued on Aug. 6, 1997 (corresponding to Japanese Laid-open Patent Application No. 95201/1992 (Japanese Official Gazette, Tokukaihei No. 4-95201, published on Mar. 27, 1992), which is referred to as the second light assist type magnetic recording and reproducing method, hereinafter.

In the first light assist type magnetic recording and reproducing method, a ferrimagnetic material having a magnetic compensation temperature around room temperature is used as the recording medium. Here, information is recorded in the following manner: a light beam is irradiated to the recording medium along a target recording track to raise a temperature thereof around the curie temperature, and then an external magnetic field is applied to the target track by a recording magnetic head. Also, the information is reproduced in the following manner: a target reproducing track is irradiated by a light beam to raise a temperature thereof so as to increase magnetization in a target reproducing portion, and then a magnetic flux leaking therefrom is magnetically reproduced into information by a magnetic reproducing head.

According to the first light assist type magnetic recording and reproducing method, areas other than the reproducing portion are heated to the magnetic compensation temperature. Thus, the leaking magnetic flux is so small that crosstalk from a track adjacent to the target reproducing track, that is, crosstalk from the adjacent bit, can be reduced.

In the second light assist type magnetic recording and reproducing method, the information is reproduced in the following manner: a light beam is irradiated to a track adjacent to the target reproducing track so as to raise the temperature thereof around the magnetic compensation temperature. Consequently, an adverse effect of the leaking magnetic flux from the track adjacent to the reproducing track is suppressed, and therefore, crosstalk from the same, that is, crosstalk from the adjacent bit, can be reduced.

Incidentally, in order to suppress crosstalk from the adjacent bit during the high-density recording and reproduction, both the first and second light assist type magnetic recording and reproducing methods use ferrimagnetic materials having the magnetic compensation temperature as the recording media.

However, because the ferrimagnetic material has temperature characteristics that the magnetization varies sharply around the magnetic compensation temperature, each of the first and second light assist type magnetic recording and reproducing methods has the following problems.

That is, in the first light assist type magnetic recording and reproducing method, if room temperature varies during reproduction, corresponding non-zero residual magnetization is induced from the track adjacent to the target reproducing track. In the second light assist type magnetic recording and reproducing method, corresponding non-zero residual magnetization is induced from the track adjacent to the target reproducing track if the heating temperature varies during reproduction.

Consequently, a leaking magnetic flux is caused as crosstalk by the residual magnetization induced from the track adjacent to the target reproducing track, and overlaps with a reproducing signal, thereby deteriorating the S/N of the reproducing signal.

SUMMARY OF THE INVENTION

It is therefore an object of the present invention to provide a high-density reproducible magnetic recording medium, from which a reproducing signal with excellent S/N is obtained, and a magnetic reproducing method thereof.

In order to fulfill the above and other objects, the magnetic recording medium of the present invention is characterized in that it has a magnetic layer which records a magnetization direction in accordance with information, and that the magnetic layer includes two magnetic films having the same magnetization directions in a reproducing area and opposite magnetization directions in the other areas.

According to the above arrangement, information is reproduced from the reproducing area in the magnetic layer of the magnetic recording medium.

Incidentally, in a conventional magnetic recording medium including a ferrimagnetic material having a magnetic layer of a single-layer structure, magnetization in an area (adjacent area) adjacent to the reproducing area in the magnetic layer is eliminated by keeping the adjacent area at the magnetic compensation temperature. Consequently, crosstalk caused by the magnetization in the adjacent area can be prevented, so that a reproducing signal obtained from the reproducing area is not adversely affected.

However, the magnetization of the ferrimagnetic material varies sharply depending on temperatures around the magnetic compensation temperature. Thus, only a slight shift from the magnetic compensation temperature in the adjacent area makes elimination of the magnetization impossible, thereby producing non-zero residual magnetization therein.

In contrast, according to the arrangement of the present invention, the magnetic layer includes two magnetic films, and the magnetization directions of these magnetic films are the same in the reproducing area and opposite in the other areas. Consequently, the magnetization of each magnetic film is intensified by the other in the reproducing area and cancelled out by the other in the other areas.

In other words, even if the temperature changes in the areas other than the reproducing area, the residual magnetization induced in each magnetic film is cancelled out, because the magnetization directions are opposite. Thus, crosstalk caused by the residual magnetization induced by a temperature change can be prevented in a reliable manner. On the other hand, because the magnetization directions of the two magnetic films are the same in the reproducing area, a total of the magnetization of each magnetic film becomes large, and so does a reproducing signal.

As has been discussed, according to the present magnetic recording medium, crosstalk can be prevented in a reliable manner, thereby realizing the recording at a higher density.

Also, in order to fulfill the above and other objects, the magnetic reproducing method of the present invention is a reproducing method for a magnetic recording medium having a magnetic layer including two magnetic films, characterized by having the steps of:

(a) aligning the magnetization directions of the two magnetic films in the reproducing area in the same direction; and (b) aligning the magnetization directions of the two magnetic films in areas other than reproducing area in opposite directions.

According to the above method, the magnetization directions of the two magnetic films are aligned in the same direction in the reproducing area and in the opposite directions in the other areas. Consequently, the magnetization of each magnetic film is intensified by the other in the reproducing area, and in the other areas, even if the residual magnetization is induced by a temperature change, the residual magnetization of each magnetic film is cancelled out by the other.

Hence, not only can a large reproducing signal be obtained from the reproducing area, but also crosstalk caused by the residual magnetization in the other areas can be prevented in a reliable manner, thereby realizing the recording at a higher density.

For a fuller understanding of the nature and advantages of the invention, reference should be made to the ensuing detailed description taken in conjunction with the accompanying drawings.

BRIEF DESCRIPTION OF THE DRAWINGS

FIG. 3(a) is a view explaining a hysteresis curve indicating a relation between the magnetization and a magnetic field, and FIG. 3(b) is a view explaining the magnetization directions;

FIG. 4(b) is a view explaining the magnetization directions;

FIG. 5(a) is a view explaining a hysteresis curve indicating a relation between the magnetization and a magnetic field, and FIG. 5(b) is a view explaining the magnetization directions;

FIG. 6(b) is a view explaining the magnetization directions;

FIG. 7(a) is a view explaining a hysteresis curve indicating a relation between the magnetization and a magnetic field, and FIG. 7(b) is a view explaining the magnetization directions;

FIG. 11(a) is a view explaining a hysteresis curve indicating a relation between the magnetization and a magnetic field, and FIG. 11(b) is a view explaining the magnetization directions;

FIG. 12(a) is a view explaining a hysteresis curve indicating a relation between the magnetization and a magnetic field, and FIG. 12(b) is a view explaining the magnetization directions;

FIG. 13(a) is a view explaining a hysteresis curve indicating a relation between the magnetization and a magnetic field, and FIG. 13(b) is a view explaining the magnetization directions;

FIG. 14(a) is a view explaining a hysteresis curve indicating a relation between the magnetization and a magnetic field, and FIG. 14(b) is a view explaining the magnetization directions;

FIG. 15(a) is a view explaining a hysteresis curve indicating a relation between the magnetization and a magnetic field, and FIG. 15(b) is a view explaining the magnetization directions.

DESCRIPTION OF THE EMBODIMENTS (Embodiment 1)

Referring to FIGS. 1 through 8, the following description will describe an example embodiment of the present invention.

Figure 2:
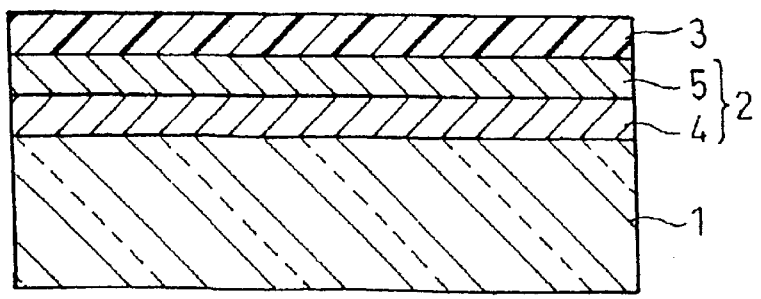
FIG. 2 is a schematic cross section of the magnetic recording medium of FIG. 1.

As shown in FIG. 2, a magnetic recording medium in accordance with the present embodiment includes a disk substrate 1 serving as a supporting substrate, a magnetic layer 2, and a protecting film 3, which are sequentially layered in a vertical direction in this order. Information is reproduced from the magnetic recording medium by heating a track from which the information will be reproduced (hereinafter, referred to as reproducing track) by a microscopic heat source to a temperature at which information can be reproduced magnetically (hereinafter, referred to as magnetically reproducible temperature).

Although it is not illustrated in the drawing, a lubricating film made of a liquid fluorine-based compound, such as perfluoropolyether, is generally formed over the protecting film 3 to secure lubrication between the magnetic recording medium and a magnetic reproducing head which records and reproduces information.

Suitable examples of the disk substrate 1 include a NiP-plated Al alloy substrate, a glass with chemically reinforced surfaces or crystallized glass substrate, and a monocrystal sapphire substrate with excellent chemical stability and mechanical properties. These substrates have excellent resistance to impact and lubrication, thereby realizing high-density magnetic recording and reproduction.

Suitable examples of the protecting film 3 include an amorphous C (carbon) film having excellent resistance to sliding of the magnetic reproducing head, an amorphous C (carbon) film having improved film hardness with addition of hydrogen or nitrogen, and a DLC (Diamond-Like Carbon) film. Of all the examples, the DLC film is particularly advantageous in that it has both the mechanical strength and self-lubrication.

The magnetic reproducing head used in recording and reproducing of the above-arranged magnetic recording medium is generally positioned to oppose the protecting film 3 on the side opposite to the disk substrate 1 side with a space of up to 100 nm. Suitable examples of the magnetic reproducing head include a thin film magnetic reproducing head with high-speed modulation and high-sensitivity reproduction, and a magnetic reproducing head using a magneto-resistive effect element, such as MR and GMR.

A specific area (hereinafter, referred to as reproducing area) in the reproducing track of the magnetic layer 2 of the above-arranged magnetic recording medium is heated by, for example: ① a method of heating the reproducing area in the magnetic recording medium by focusing a laser beam thereon through the disk substrate 1 to a beam spot of a microscopic size, preferably up to 1 μm across; ② a method of heating the reproducing area in the magnetic recording medium by leading a laser beam emitted from a light irradiating series positioned in the same side as the magnetic reproducing head and focused to a beam spot of substantially the above-specified size; ③ a method of heating the reproducing area in the magnetic recording medium by means of radiation heat or heat conduction from a microscopic heat source (resistor) provided near the magnetic reproducing head and preferably having a width of up to 1 μm.

As shown in FIG. 2, the magnetic layer 2 serving as an information recording and reproducing layer includes two magnetic films: a second magnetic film 4 and a first magnetic film 5, which are sequentially layered on the disk substrate 1 in a vertical direction in this order.

Each of the first magnetic film 5 and second magnetic film 4 is made of rare earth transition metal amorphous alloy. One of them is made of a rare-earth-metal-rich (RE-rich) ferrimagnetic material having the magnetic compensation temperature higher than room temperature, and the other is made of a transition-metal-rich (TM-rich) ferrimagnetic material. The first magnetic film 5 and second magnetic film 4 are made of ferrimagnetic materials having different polarities, and there is an exchanged interaction (exchanged coupling force) between the two films. In short, the first magnetic film 5 and second magnetic film 4 are coupled to each other by means of exchanged coupling.

Figure 1:
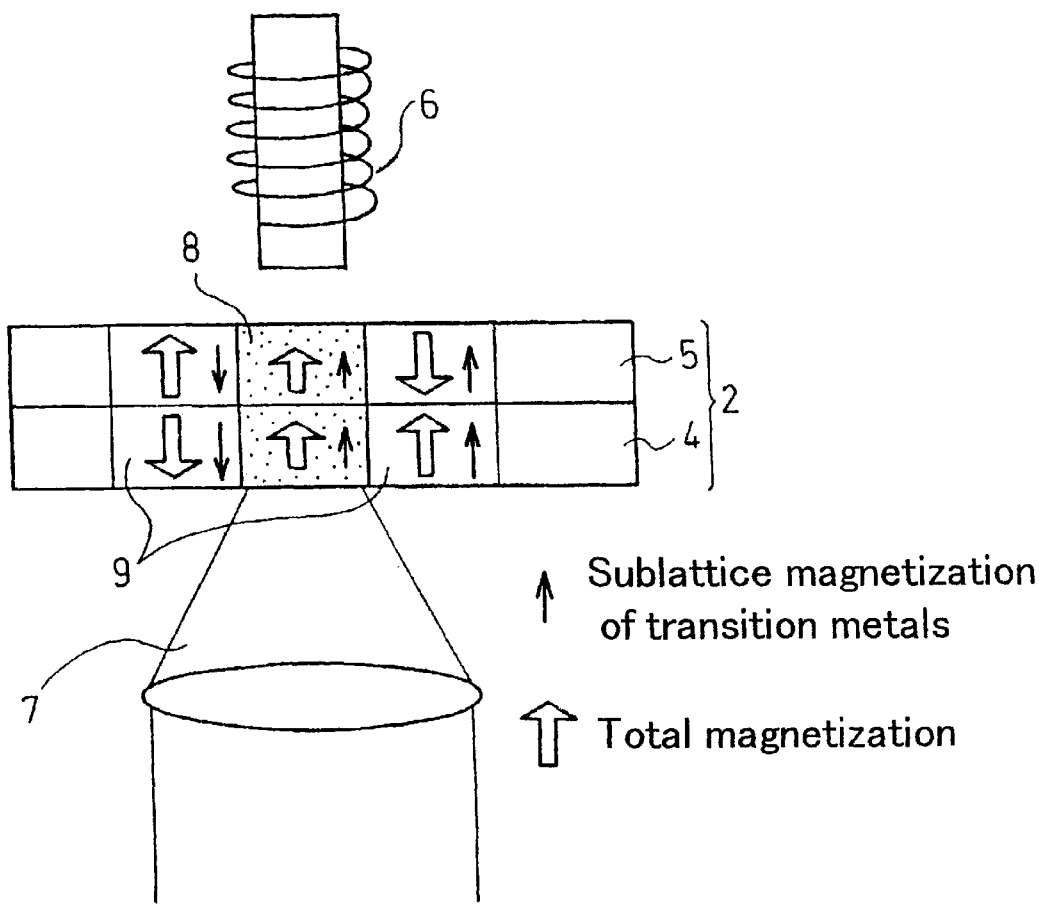
FIG. 1 is a view explaining a magnetization state of a magnetic recording medium in accordance with an example embodiment of the present invention at a reproducing action.

With reference to FIG. 1, the following will explain the magnetization state of each magnetization film during reproduction from the magnetic layer 2. In the following, assume that the magnetic layer 2 includes the TM-rich second magnetic film 4 and the RE-rich first magnetic film 5. The disk substrate 1 and protecting film 3 shown in FIG. 2 are omitted in FIG. 1 for ease of explanation.

With the above magnetic recording medium, information is reproduced as shown in FIG. 1. That is, a magnetic reproducing track portion 8 which will serve as the reproducing area in the magnetic layer 2 is heated to the magnetically reproducible temperature by a light beam (microscopic heat source) 7 emitted from unillustrated light irradiating means from the second magnetic film 4 side, and the information is reproduced magnetically by the magnetic reproducing head 6 placed in an opposing position through the magnetic layer 2. In the drawing, an open arrow represents the total magnetization of each magnetic film and a solid arrow represents the sublattice magnetization of transition metals.

During reproduction from the magnetic layer 2, the temperature of peripheral track portions 9, which will serve as areas adjacent to the magnetic reproducing track portion 8, is around room temperature. Thus, as shown in FIG. 1, the sublattice magnetization of the rare earth metals and that of the transition metals are aligned in the same direction in the peripheral track potions 9 having approximately room temperature. Therefore, the direction of the total magnetization of each magnetic film having a different polarity is opposite to the other, and hence the leaking magnetic fluxes from the two magnetic films are cancelled out with each other. Consequently, crosstalk, caused by the leaking magnetic fluxes from the peripheral track portions 9 which will serve as the adjacent areas to the magnetic reproducing track portion 8 having approximately room temperature during reproduction, can be suppressed.

Further, because the magnetic layer 2 is of a double-layer structure including the magnetic materials coupled to each other by means of exchanged coupling: the first magnetic film 5 and second magnetic film 4, the magnetic reproducing head 6 detects a vector sum of the magnetic flux from each magnetic film as the magnetic flux from the magnetic recording medium having the magnetic layer 2.

Thus, by adjusting the product Ms·d, where Ms is the magnetization (magnitude) and d is a film thickness of each magnetic film, the leaking magnetic fluxes from the peripheral track portions 9 can be cancelled out completely regardless of the size of a space between the magnetic reproducing head 6 and each magnetic film. In other words, crosstalk from the peripheral track portions 9 can be reduced to ideal 0 (zero).

On the other hand, as shown in FIG. 1, in the magnetic reproducing track portion 8 which will serve as a heated portion heated to the magnetically reproducible temperature by the light beam 7, the two magnetic films have the same polarity, and thus, the directions of the sublattice magnetization of the rare earth metals and that of the transition metals are aligned in the same direction, and so is the total magnetization of each magnetic film. Consequently, the leaking magnetic fluxes from the magnetic reproducing track portion 8 in the magnetic layer 2 are intensified with each other.

Thus, according to the above-arranged magnetic recording medium, not only can crosstalk from the peripheral track portions 9 be reduced, but also a reproducing signal from the magnetic reproducing track portion 8 can be intensified, thereby significantly improving the S/N of the reproducing signal.

Here, in order to cancel out the leaking magnetic fluxes from the peripheral track portions 9 completely during reproduction by adjusting the product Ms·d in each magnetic film, at least the following relational expression (1) should be established at the portions having approximately room temperature in the magnetic layer 2:

$$Ms1 \cdot d1 < Ms2 \cdot d2 \tag{1}$$

where Ms1 is the magnetization and d1 is a film thickness of the first magnetic film 5 which is the magnetic film placed closer to the magnetic reproducing head 6, and Ms2 is the magnetization and d2 is a film thickness of the other second magnetic film 4.

By arranging the magnetic layer 2 in such a manner that the product (Ms1·d1) of the first magnetic film 5 which is placed closer to the magnetic reproducing head 6 becomes smaller than the product (Ms2·d2) of the second magnetic film 4 which is placed farther from the magnetic reproducing head 6, the adverse effects of the leaking magnetic fluxes from the two magnetic films having the opposite magnetization directions in the portions having approximately room temperature can be cancelled out completely (reduced to 0) at the magnetic flux detecting position by the magnetic reproducing head 6.

In order to reduce crosstalk from the peripheral track portions 9, the following relational expression (2) may be established in addition to the relational expression (1) above:

$$\sigma w/2Ms1 \cdot d1 - \sigma w/2Ms2 \cdot d2 > Hc1 + Hc2 \tag{2}$$

where Hc1 is a coercive force of the first magnetic film 5 which is placed closer to the magnetic reproducing head 6; Hc2 is a coercive force of the second magnetic film 4 which is placed farther from the magnetic reproducing head 6; and σw is interface magnetic domain wall energy stored at the boundary between the two magnetic films.

Figure 3:
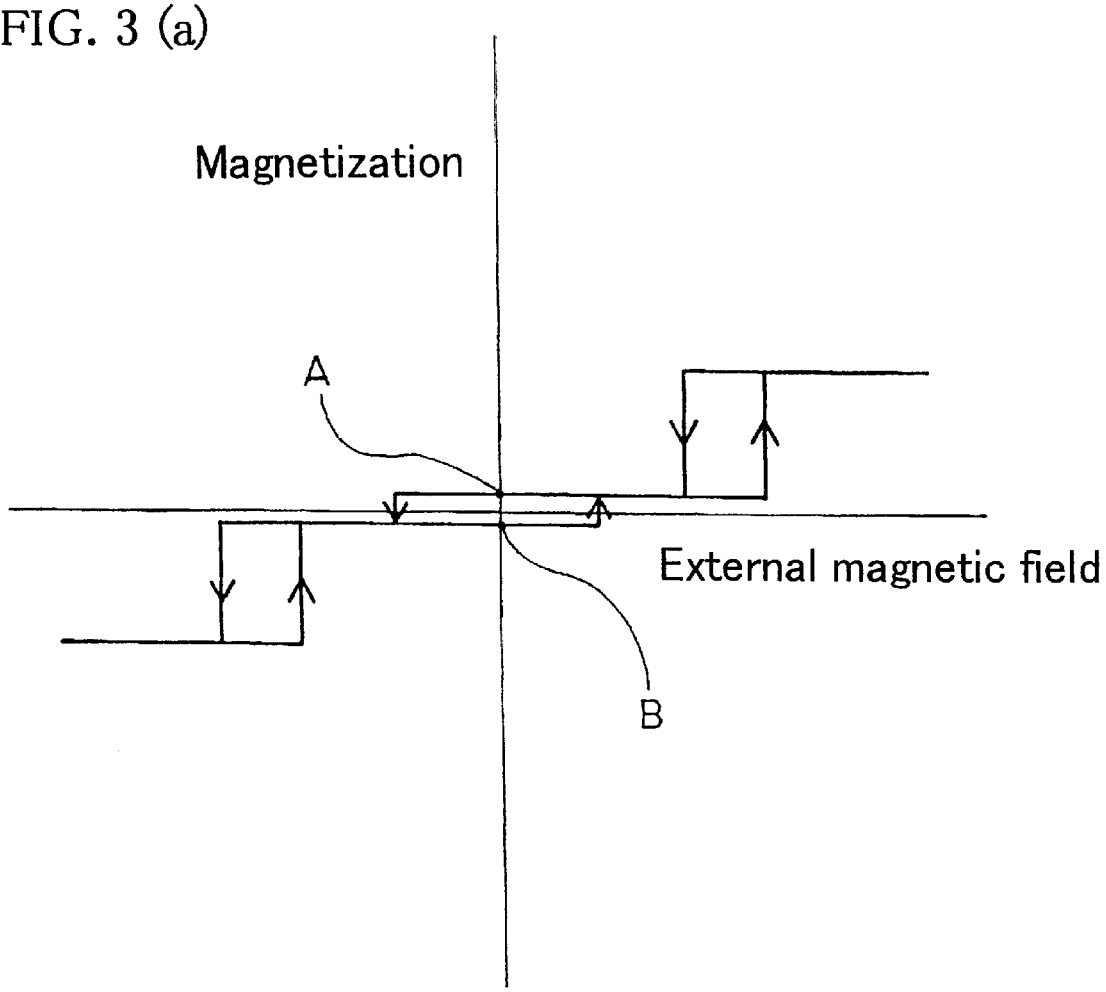
FIGS. 3(a) and 3(b) show an example of the magnetization states of the magnetic recording medium of FIG. 2 around room temperature.
Figure 3:
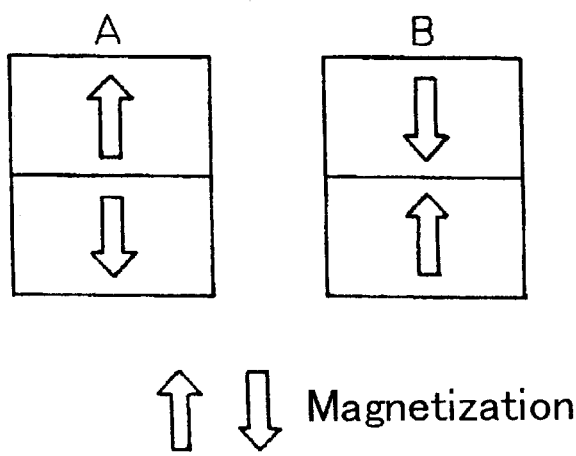

When the relational expression (2) above is established, the hysteresis curve of the overall magnetization of the recording medium in the portions having approximately room temperature is the one shown in FIG. 3 (a). Capital letters A and B represent states of the residual magnetization of the magnetic recording medium when the relational expression (2) above is established, which respectively correspond to "1" and "0" of the recorded binary information. Hereinafter, capital letters A and B are defined as above, and the explanation thereof is omitted.

Thus, in this case, the magnetization directions of the two magnetic films forming the magnetic layer 2 of the magnetic recording medium in the portions (peripheral track portions 9) having approximately room temperature during magnetic reproduction are shown in FIG. 3(b) as the states A and B. Consequently, the adverse effects from the first magnetic film 5 and second magnetic film 4 forming the magnetic layer 2 can be cancelled out with each other, thereby making it possible to reduce crosstalk caused by the leaking magnetic fluxes from the peripheral track portions 9 in the magnetic recording medium.

Further, in order to reduce crosstalk from the peripheral track portions 9, the following relational expressions (3) and (4) may be established in addition to the relational expression (1) above:

$$Hc1 < \sigma w/2Ms1 \cdot d1 \tag{3}$$

$$Hc1 + Hc2 > \sigma w/2Ms1 \cdot d1 - \sigma w/2Ms2 \cdot d2 > Hc1 - Hc2 \tag{4}$$

According to the magnetic recording medium, in which all of the relational expressions (1), (3), and (4) are established, the hysteresis curve of the overall magnetization of the recording medium in the portions having approximately room temperature is the one shown in FIG. 4(a).

Figure 4:
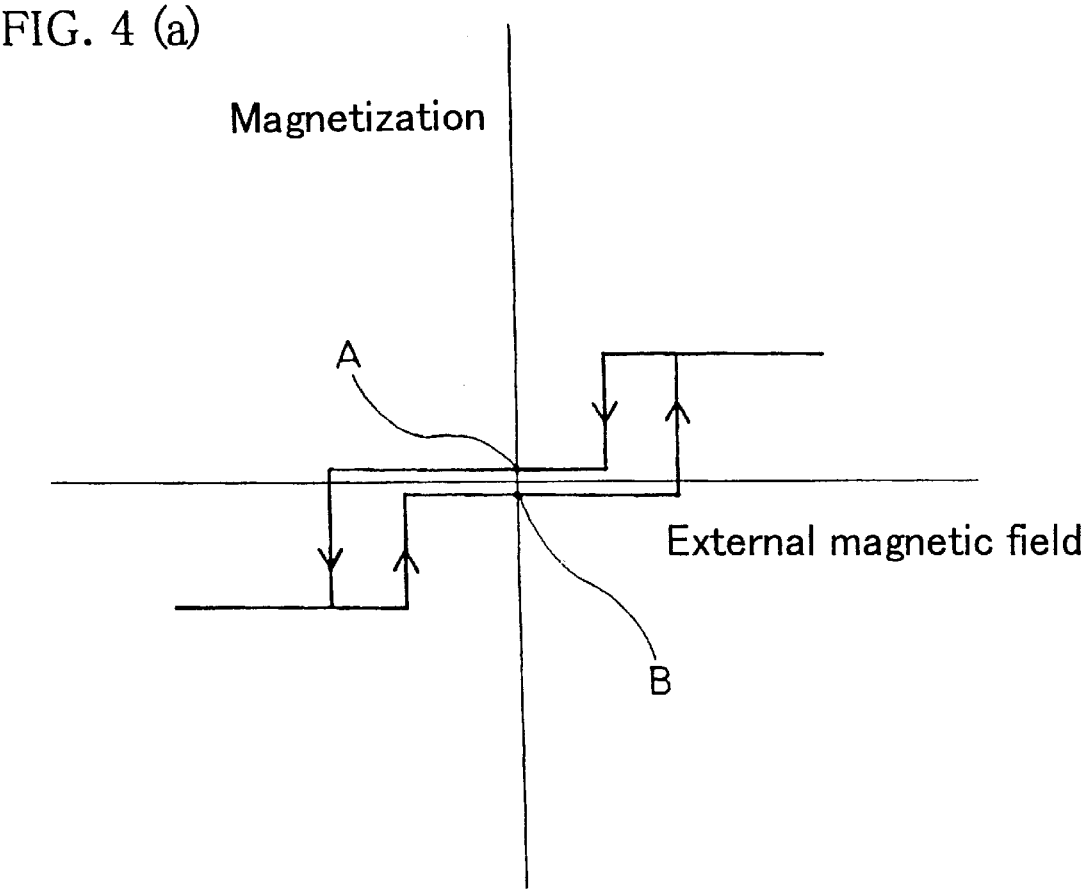
FIGS. 4(a) and 4(b) show an example of the magnetization states of the magnetic recording medium of FIG. 2 around room temperature, and FIG. 4 (a) is a view explaining a hysteresis curve indicating a relation between the magnetization and a magnetic field.
Figure 4:
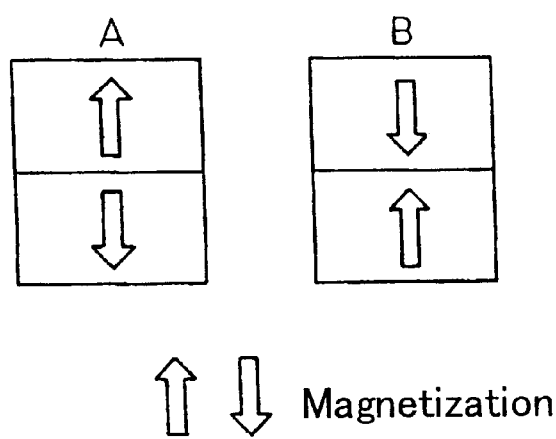
Figure 5:
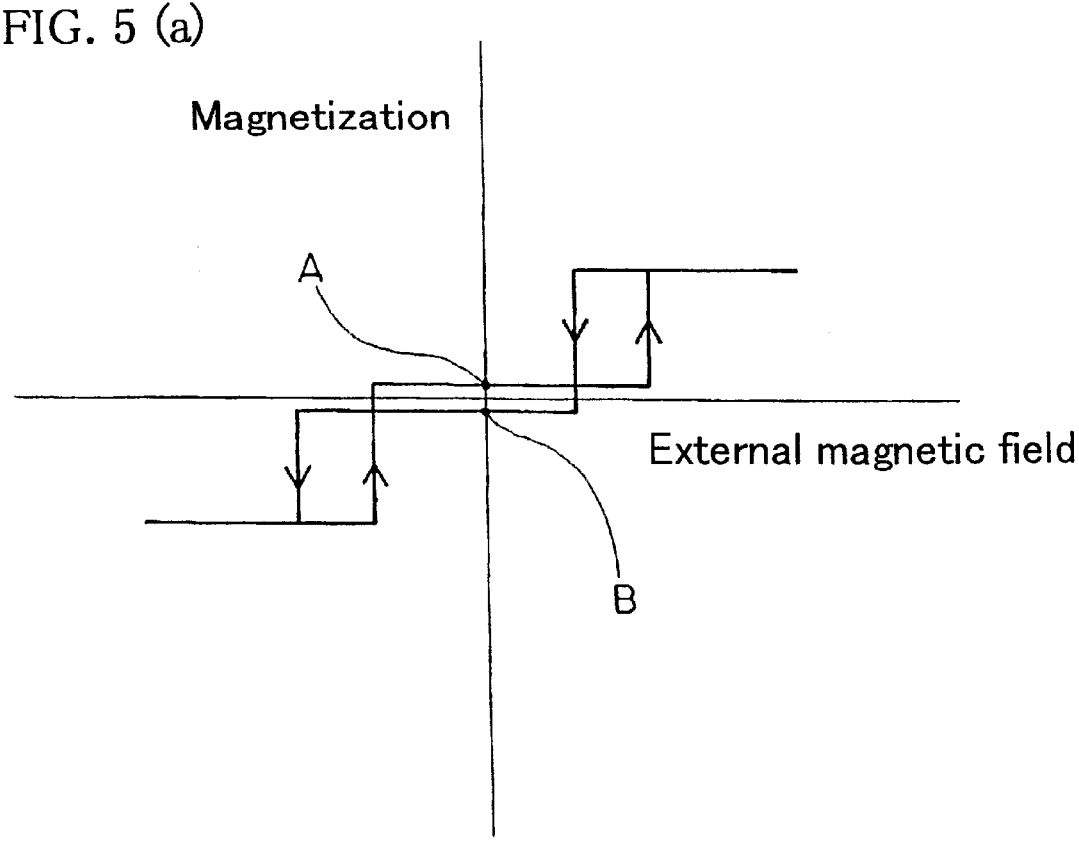
FIGS. 5(a) and 5(b) show an example of the magnetization states of the magnetic recording medium of FIG. 2 around room temperature.
Figure 5:
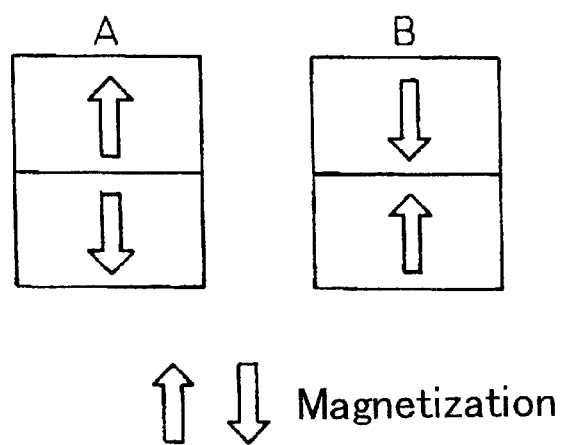

Thus, in case of the above magnetic recording medium, the magnetization directions of the two magnetic films forming the magnetic layer 2 of the magnetic recording medium in the portions (peripheral track portions 9) having approximately room temperature during magnetic reproduction are shown in FIG. 4 (b) as the states A and B. Consequently, the adverse effects from the two magnetic films forming the magnetic layer 2 can be cancelled out with each other, thereby making it possible to reduce crosstalk caused by the leaking magnetic fluxes from the peripheral track portions 9 in the magnetic recording medium.

Further, in order to reduce crosstalk from the peripheral track portions 9, the following relational expressions (5) and (6) may be established in addition to the relational expression (1) above:

$$Hc2 < \sigma w/2Ms2 \cdot d2 \tag{5}$$

$$Hc1 - Hc2 > \sigma w/2Ms1 \cdot d1 - \sigma w/2Ms2 \cdot d2 \tag{6}$$

According to the magnetic recording medium, in which all of the relational expressions (1), (5) and (6) are established, the hysteresis curve of the overall magnetization of the recording medium in the portions having approximately room temperature is the one shown in FIG. 5(a).

Thus, in case of the above magnetic recording medium, the magnetization directions of the two magnetic films forming the magnetic layer 2 of the magnetic recording medium in the portions (peripheral track portions 9) having approximately room temperature during magnetic reproduction are shown in FIG. 5(b) as the states A and B. Consequently, the adverse effects from the two magnetic films forming the magnetic layer 2 can be cancelled out with each other, thereby making it possible to reduce crosstalk caused by the leaking magnetic fluxes from the peripheral track portions 9 in the magnetic recording medium.

The foregoing explained, with the relational expressions above, the hysteresis curves of the magnetization in the portions (the peripheral track portions 9 herein) having approximately room temperature in the magnetic recording medium. The following will explain the hysteresis curves of the magnetization in the portion (the magnetic reproducing track portion 8 herein) heated to the magnetically reproducible temperature in the magnetic recording medium.

In order to further reduce crosstalk from the peripheral track portions 9 and intensify the reproducing signal, a combination of the relational expressions (3) and (4) above or a combination of the relational expressions (5) and (6) above must be established around room temperature, and either of the following relational expressions (7) and (8) must be established at the magnetically reproducible temperature:

$$Hc2 - Hc1 > \sigma w/2Ms1 \cdot d1 + \sigma w/2Ms2 \cdot d2 \tag{7}$$

$$(Ms1 \cdot d1 \leq Ms2 \cdot d2)$$

$$Hc1 - Hc2 > \sigma w/2Ms1 \cdot d1 + \sigma w/2Ms2 \cdot d2 \tag{8}$$

$$(Ms1 \cdot d1 \geq Ms2 \cdot d2).$$

According to the magnetic recording medium satisfying the above conditions, by establishing a combination of the relational expressions (3) and (4) above or a combination of the relational expressions (5) and (6) above, crosstalk, caused by the leaking magnetic fluxes from the portions having approximately room temperature during magnetic reproduction, can be reduced.

In addition, by establishing the relational expression (7) or (8) above, the hysteresis curve of the overall magnetization of the magnetic recording medium in the portion heated to the magnetically reproducible temperature becomes as the one shown in FIG. 6(a).

Figure 6:
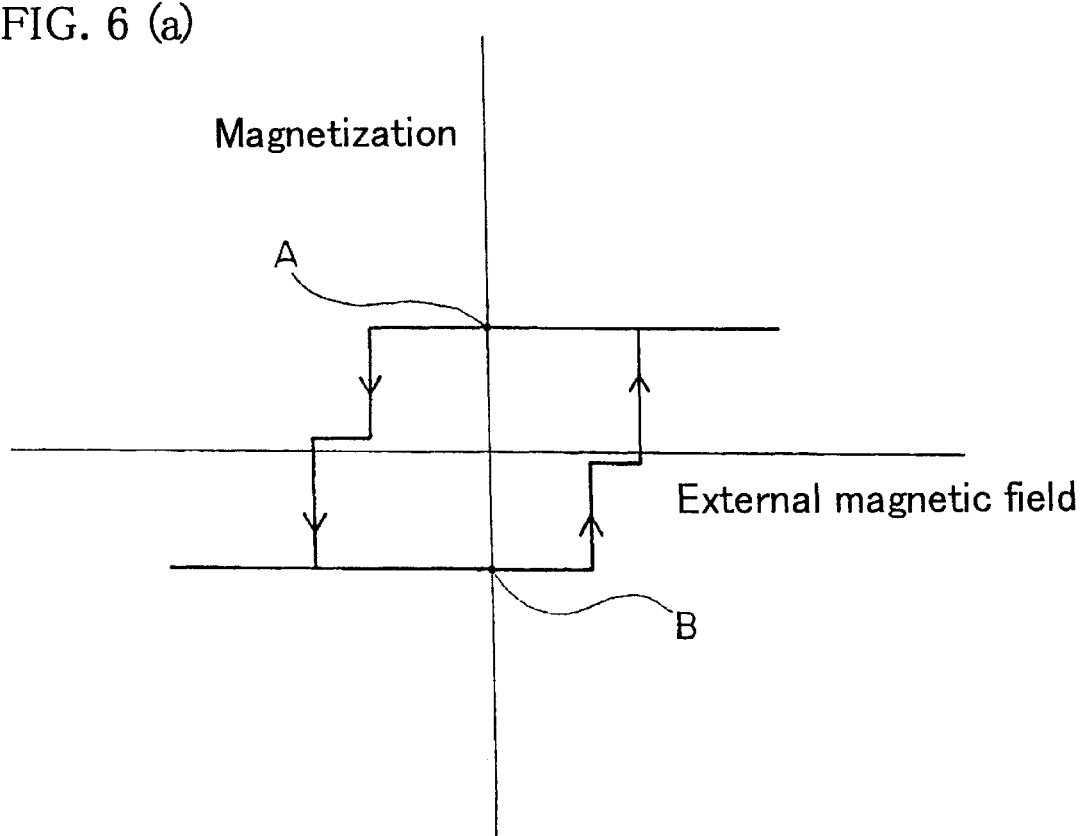
FIGS. 6(a) and 6(b) show an example of the magnetization states of the magnetic recording medium of FIG. 2 at a magnetically reproducible temperature, and FIG. 6 (a) is a view explaining a hysteresis curve indicating a relation between the magnetization and a magnetic field.
Figure 6:
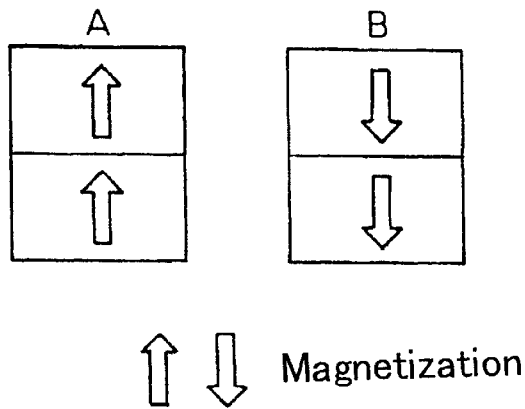
Figure 7:
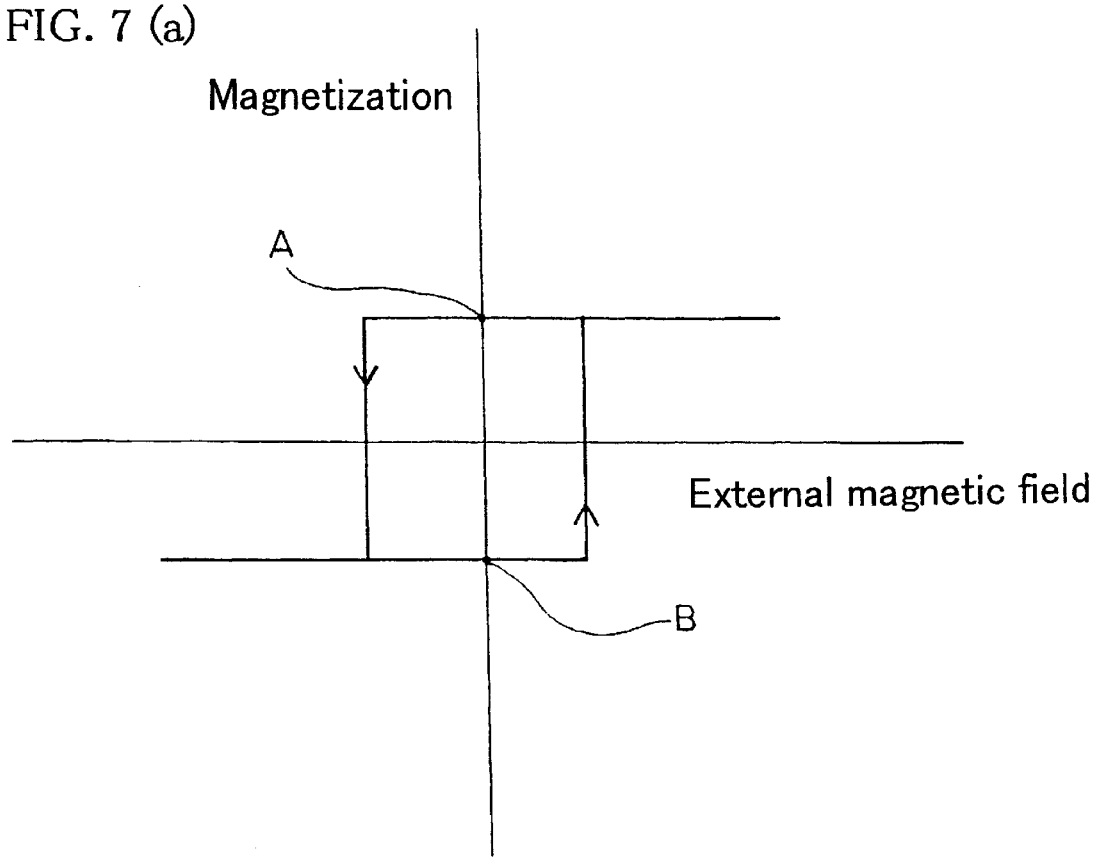
FIGS. 7(a) and 7(b) show an example of the magnetization states of the magnetic recording medium of FIG. 2 at a magnetically reproducible temperature.
Figure 7:
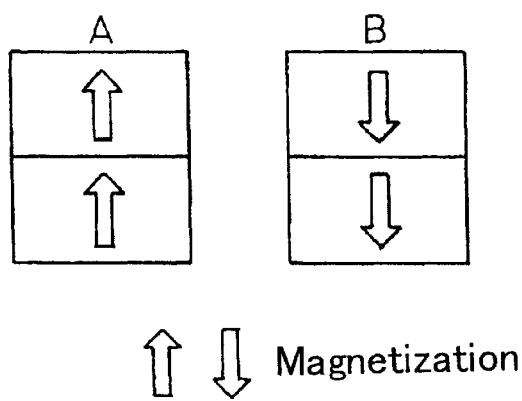

Thus, in case of the above magnetic recording medium, the magnetization directions of the two magnetic films forming the magnetic layer 2 of the magnetic recording medium in the portion heated to the magnetically reproducible temperature during magnetic reproduction are illustrated in FIG. 6 (b) as the states A and B. Consequently, the magnetization directions of the two magnetic films forming the magnetic layer 2 are aligned in the same direction, and therefore, the magnetization of each magnetic film is intensified by the other. Thus, the leaking magnetic fluxes from the portion heated to the magnetically reproducible temperature (magnetic reproducing track portion 8) are increased, thereby making it possible to obtain a large reproducing signal.

In order to further reduce crosstalk from the peripheral track portions 9 and intensify the reproducing signal, a combination of the relational expressions (3) and (4) above, or a combination of the relational expressions (5) and (6) above must be established around room temperature, and the following relational expression (9) must be established at the magnetically reproducible temperature:

$$|Hc1-Hc2| < \sigma w/2Ms1 \cdot d1 + \sigma w/2Ms2 \cdot d2 \qquad (9).$$

According to the magnetic recording medium satisfying the above conditions, by establishing a combination of the relational expressions (3) and (4) above, or a combination of the relational expressions (5) and (6) above, crosstalk, caused by the leaking magnetic fluxes from the portions having approximately room temperature during magnetic reproduction, can be reduced.

In addition, by establishing the relational expression (9), the hysteresis curve of the overall magnetization of the magnetic recording medium in the portion heated to the magnetically reproducible temperature becomes as the one shown in FIG. 7(a).

Thus, in case of the above magnetic recording medium, the magnetization directions of the two magnetic films forming the magnetic layer 2 of the magnetic recording medium in the portion heated to the magnetically reproducible temperature during magnetic reproduction are illustrated in FIG. 7(b) as the states A and B. Consequently, the magnetization directions of the two magnetic films forming the magnetic layer 2 are aligned in the same direction, and the magnetization of each magnetic film is intensified by the other. Thus, the leaking magnetic fluxes from the portion (magnetic reproducing track portion 8) heated to the magnetically reproducible temperature is increased, thereby making it possible to obtain a large reproducing signal.

Next, the following will explain an example of the magnetic layer 2 of the magnetic recording medium in accordance with the present embodiment. Here, the function and effect will be explained in a case where the magnetic layer 2 includes the first magnetic film 5 made of RE-rich rare earth transition metal amorphous alloy having a film thickness of approximately 45 nm and a composition of $(Tb_{0.75}Dy_{0.25})_{0.34}(Fe_{0.72}Co_{0.28})_{0.66}$, and the second magnetic film 4 made of TM-rich rare earth transition metal amorphous alloy having a film thickness of approximately 55 nm and a composition of $(Tb_{0.75}Dy_{0.25})_{0.20}Fe_{0.80}$.

Figure 8:
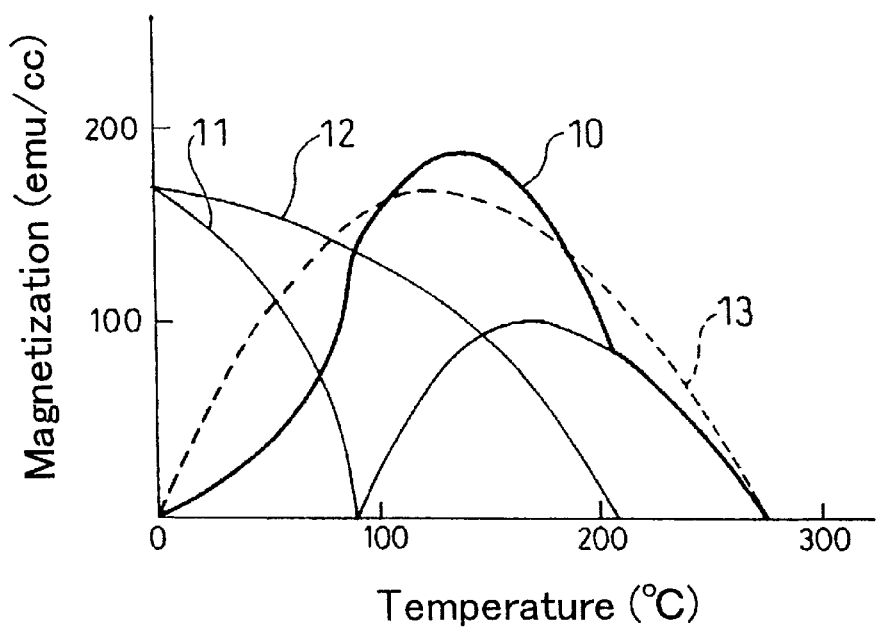
FIG. 8 shows a graph explaining magnetic characteristics of the magnetic recording medium of FIG. 2.

FIG. 8 is a graph showing the temperature dependency of the magnetization Ms of the magnetic layer 2 in the magnetic recording medium. Hereinafter, the horizontal axis in each graph showing the temperature dependency of the magnetization Ms including the one in FIG. 8 represents an increase in temperature (°C.) from room temperature used as the reference.

In the graph of FIG. 8, a curve 10 indicates the temperature dependency of the magnetization Ms of the magnetic layer 2; a curve 11 indicates the temperature dependency of the magnetization Ms of the RE-rich first magnetic film 5 alone which forms the magnetic layer 2; a curve 12 indicates the temperature dependency of the magnetization Ms of the TM-rich second magnetic film 4 alone which forms the magnetic layer 2; and for the purpose of comparison, a curve 13 indicates the temperature dependency of the magnetization Ms of a typical example of the magnetic recording medium having the magnetic compensation temperature around room temperature, a film thickness of approximately 100 nm, and a composition of $(Tb_{0.75}Dy_{0.25})_{0.30}(Fe_{0.72}Co_{0.28})_{0.70}$.

The following will show the magnetic properties of each magnetic film having approximately room temperature:

coercive force of 1st magnetic film 5 (Hc1):8.4 kOe magnetization of 1st magnetic film 5 (Ms1):170 emu/cc film thickness of 1st magnetic film 5 (d1):45 nm coercive force of 2nd magnetic film 4 (Hc2):1 kOe magnetization of 2nd magnetic film 4 (Ms2):170 emu/cc film thickness of 2nd magnetic film 4 (d2):55 nm interface magnetic domain wall energy ($\sigma w$):2 erg/cm$^2$ Thus, it is understood that the relational expression (1) above : Ms1·d1=0.765 memu/cm$^2$<Ms2·d2=0.935 memu/cm$^2$, the relational expression (5) above: Hc2=1000 Oe<$\sigma w$/2Ms2·d2=1070 Oe, and the relational expression (6) above: Hc1−Hc2=7375 Oe>$\sigma w$/2Ms1·d1−$\sigma w$/2Ms2·d2=237 Oe, are all established.

In other words, the magnetization direction of the first magnetic film 5 and that of the second magnetic film 4 are opposite in parallel around room temperature, and the adverse effects on the magnetic reproducing head 6 from the two magnetic films are cancelled out with each other. In practice, the curve 10 indicating the overall magnetization of the magnetic recording medium shows a small value around room temperature in the graph of FIG. 8. Consequently, it is understood that the adverse effects of crosstalk from the peripheral track portions 9 having approximately room temperature during reproduction are reduced.

Further, comparison with the curve 13 indicating the characteristics of the light assist type magnetic recording medium made of a conventional single-layer magnetic film reveals that the total magnetization is suppressed around room temperature. Thus, it is understood that the magnetic layer 2 of the present invention attains good resistance to the adverse effect of the temperature change around room temperature.

Next, the following will show the magnetic properties of each magnetic film in the magnetic reproducing track portion 8 heated to the magnetically reproducible temperature by the light beam 7. The magnetically reproducible temperature used herein is set to a temperature at which the overall magnetization of the magnetic recording medium reaches or almost reaches the maximum. The following will show the magnetic properties at approximately 130° C., namely, the magnetically reproducible temperature:

coercive force of 1st magnetic film 5 (Hc1):12.5 kOe magnetization of 1st magnetic film 5 (Ms1):110 emu/cc film thickness of 1st magnetic film 5 (d1):45 nm coercive force of 2nd magnetic film 4 (Hc2):700 Oe magnetization of 2nd magnetic film 4 (Ms2):80 emu/cc film thickness of 2nd magnetic film 4 (d2):55 nm interface magnetic domain wall energy (σw):0.7 erg/cm$^2$ Thus, it is understood that the relational expression (8) above:Hc1−Hc2=11.8 kOe>σw/2Ms1·d1+σw/2Ms2·d2=1.5 kOe, Ms1·d1=0.495 memu/cm$^2$>Ms2·d2=0.440 memu/cm$^2$ is established.

In other words, the magnetization direction of the first magnetic film 5 and that of the second magnetic film 4 are the same in parallel around the magnetically reproducible temperature, and the leaking magnetic fluxes from the magnetic reproducing track portion 8 are intensified with each other, thereby making it possible to obtain a large reproducing signal with the magnetic reproducing head 6. In practice, the curve 10 indicating the overall magnetization of the magnetic recording medium in the graph of FIG. 8 shows a value equivalent to a sum of the magnetization of the first magnetization film 5 and that of the second magnetization film 4 around 130° C., namely, the magnetically reproducible temperature. The magnetization (magnitude) at this point is by no means smaller than the one shown in the curve 13 indicating the magnetization of the light assist type magnetic recording medium made of a conventional single-layer magnetic film.

Incidentally, the present embodiment explained a case where the magnetization of the first magnetic film 5 and that of the second magnetic film 4 are of the same in magnitude and aligned in opposite directions at room temperature. However, in the practical recording device, the temperature is increased at a portion where the magnetic reproducing head and magnetic recording medium oppose each other. Thus, by taking such an increase into consideration, it is preferable to arrange that the adverse effects of the leaking magnetic fluxes caused by the magnetization from the two magnetic films are cancelled out with each other in a range between room temperature and 100° C., because the adverse effect of the crosstalk can be suppressed further. Also, by taking an output of a semiconductor laser used as a light source into consideration, it is preferable to set a magnetically reproducible temperature in a range between 120° C. and 200° C.

In the present embodiment, the first magnetic film 5 is a RE-rich rare earth transition metal amorphous film, and the second magnetic film 4 is a TM-rich rare earth transition metal amorphous film. It should be appreciated, however, that a reversed combination is also applicable.

In addition, TbDyFeCo and TbDyFe are used as the rare earth transition metal amorphous film. It should be appreciated, however, that the rare earth transition metal amorphous film is not limited to the foregoing, and for example, it can be other kinds of rare earth transition metal alloy series, such as TbCo, TbFeCo, DyFeCo, GdTbFe, GdDyFe, GdTbFeCo, and GdDyFeCo. In other words, the magnetic layer is made of, for example, amorphous alloy composed of Fe, Co, and a rare earth element, and the rare earth element is at least one of Tb, Dy, and Gd.

Of all the rare earth transition metal alloy series, a series containing Tb or Dy which induces large perpendicular magnetic anisotropy can attain a large coercive force and excellent bit stability. Also, a series containing Gd having large magnetic moment is advantageous in increasing magnetization, thereby improving the reproducing performance.

The other magnetic film bonded to the ferrimagnetic film having the magnetic compensation point is not limited to a ferrimagnetic film, and can be made of a perpendicular magnetic recording material, such as a CoCr-based (containing Co and Cr) ferromagnetic perpendicular magnetization film, a multi-layered perpendicular magnetization film made of Co/Pt or Co/Pd (containing a combination of Co and Pt or a combination of Co and Pd). In this case, the reproducing performance can be further improved with exploiting large magnetization, which is one of the characteristics of the ferromagnetic material.

Further, the present embodiment explained the magnetic recording medium, in which the relational expressions (1), (5) and (6) above are all established around room temperature, and the relational expression (8) above is established around the magnetically reproducible temperature. It should be appreciated, however, that the magnetic recording medium is not limited to the foregoing.

For example, the aforementioned relational expressions may be combined adequately. More specifically, it can be readily understood from the magnetic curve that the magnetic recording medium can include a magnetic film which satisfies a combination of the relational expressions (1) and (2), or a combination of the relational expressions (1), (3), and (4) around room temperature, and the relational expression (7) or (9) above around the magnetically reproducible temperature. In particular, a rare earth transition metal amorphous alloy film of various combinations can satisfy the above-specified conditions, because the magnetic properties of amorphous can be designed in various manners by sequentially changing a composition of the elements.

Also, the present embodiment explained the magnetic layer 2 of the double-layer structure. However, an intermediate layer may be inserted between the two magnetic films to adjust the exchanged coupling force. By inserting the intermediate layer, the magnetic recording material can be designed more flexibly, and therefore, the light assist magnetic recording and reproducing characteristics can be readily improved and optimized.

For example, the intermediate layer may be inserted between the two magnetic films to weaken the exchanged coupling force therebetween as previously mentioned. In this case, the magnetization inverting magnetic field in the magnetic layer can be made smaller as an effect. In addition, in case that the intermediate layer is made of materials based on the rare earth transition metals, GdFe or GdFeCo having small anisotropy is used, for example.

However, the use of the intermediate layer is not limited to weaken the exchanged coupling force between the two magnetic films as described above, and the intermediate layer can be inserted to increase the exchanged coupling force as well.

(Embodiment 2)

Referring to FIGS. 9 through 16, the following description will describe another example embodiment of the present invention. Hereinafter, like components are labeled with like reference numerals with respect to Embodiment 1, and the description of these components is not repeated for ease of explanation.

Figure 10:
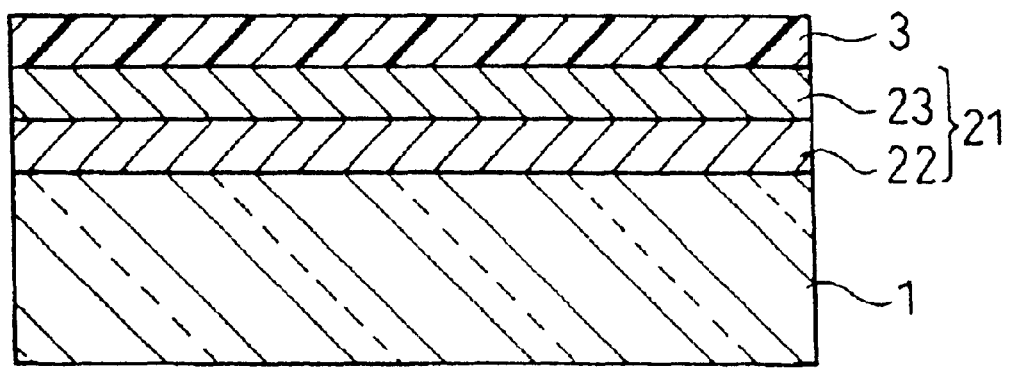
FIG. 10 is a schematic cross section of the magnetic recording medium of FIG. 9.
Figure 11:
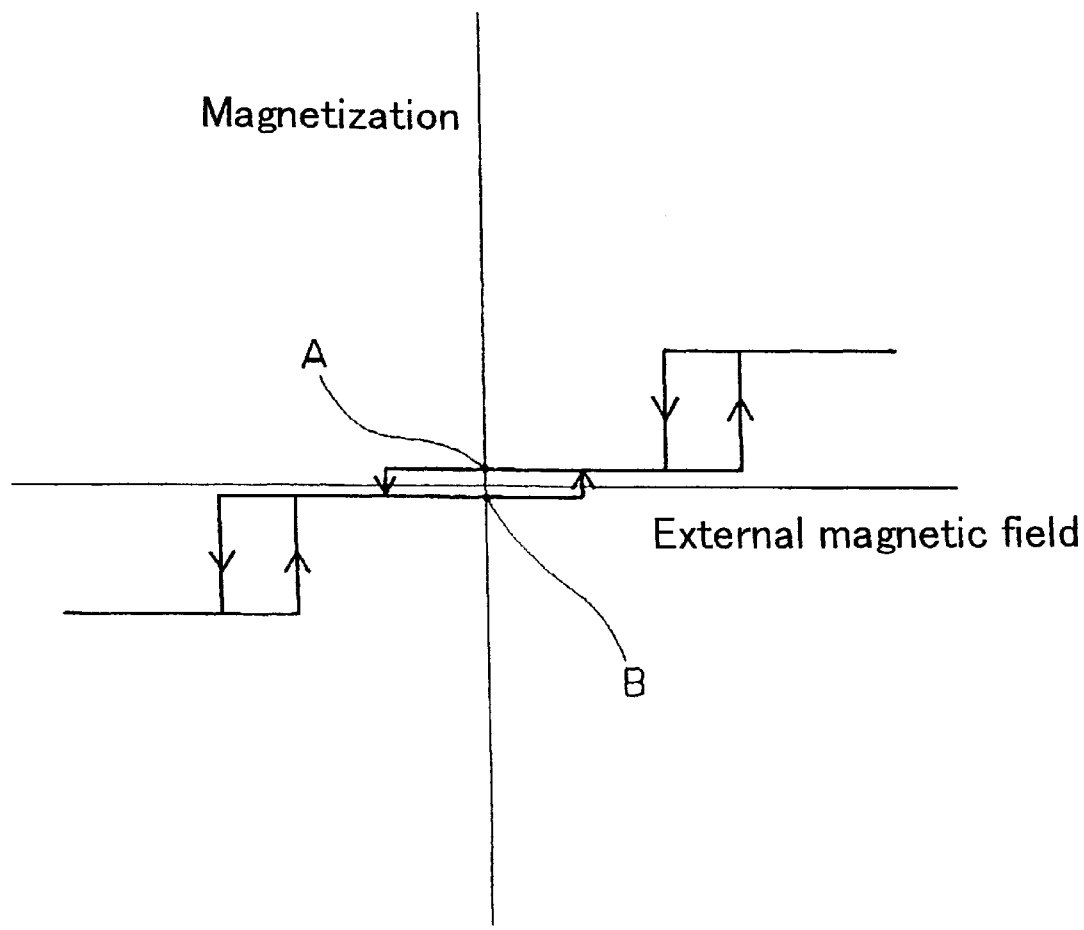
FIGS. 11(a) and 11(b) show an example of the magnetization states of the magnetic recording medium of FIG. 10 when heated.
Figure 11:
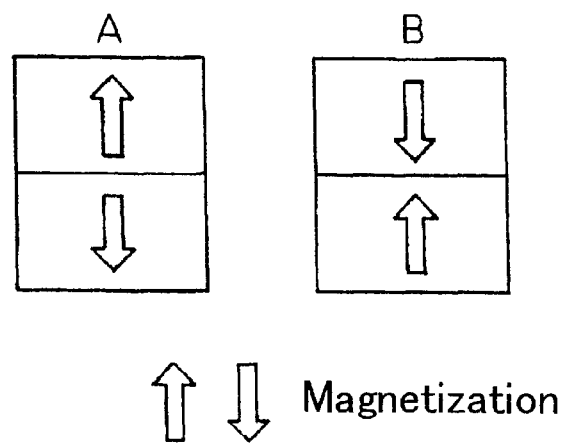

The magnetic recording medium in accordance with the present embodiment is of the same structure as its counterpart in Embodiment 1 except that the magnetic layer 2 is replaced with a magnetic layer 21 as shown in FIG. 10.

The magnetic layer 21 is of a double-layer structure including a second magnetic film 22 and a first magnetic film 23, which are sequentially layered on the disk substrate 1 in a vertically direction in this order. The first magnetic film 23 and second magnetic film 22 are both made of rare earth transition metal amorphous alloy, and at least one of the two magnetic films has a RE-rich composition and a magnetic compensation temperature higher than room temperature, and the other has a composition selected such that, during reproduction, the polarities of the two magnetic films are different in a heated area in tracks adjacent to a reproducing track and the same in the reproducing track area having approximately room temperature.

Figure 9:
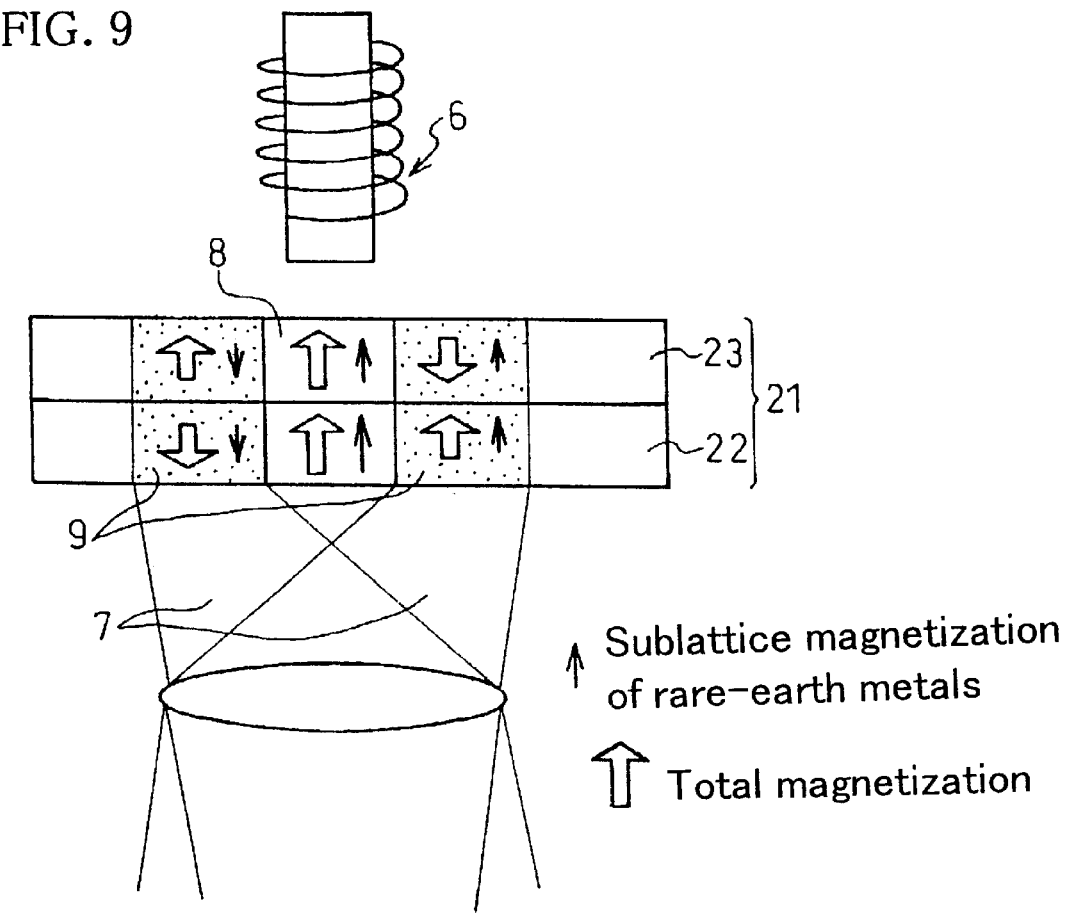
FIG. 9 is a view explaining a magnetization state of a magnetic recording medium in accordance with another example embodiment of the present invention at a reproducing action.

With reference to FIG. 9, the following will explain the magnetization state of each magnetic film during reproduction from the magnetic layer 21. In the following, assume that the magnetic layer 21 includes the first magnetic film 23 and second magnetic film 22 both having the RE-rich composition. For ease of explanation, the disk substrate 1 and protecting film 3 are omitted in FIG. 9.

With the above magnetic recording medium, information is reproduced as shown in FIG. 9. That is, peripheral track portions 9 adjacent to a magnetic reproducing track portion 8 in the magnetic layer 21 are heated by a light beam 7 emitted from unillustrated reproducing light irradiating means from the second magnetic film 22 side, and the information is reproduced magnetically by a magnetic reproducing head 6 placed in an opposing position through the magnetic layer 21. In the drawing, an open arrow represents the total magnetization of each magnetic film and a solid arrow represents the sublattice magnetization of rare earth metals.

During reproduction from the magnetic layer 21, the peripheral track portions 9 are heated around the magnetically reproducible temperature, while the temperature of the magnetic reproducing track portion 8 remains around room temperature.

Thus, as shown in FIG. 9, in the magnetic reproducing track portion 8 having approximately room temperature, the two magnetic films have the same polarity and the sublattice magnetization of rare earth metals and that of the transition metals are aligned in the same direction, and so is the direction of the total magnetization of each magnetic film. Consequently, the leaking magnetic fluxes from the two magnetic films are intensified with each other.

On the other hand, in the peripheral track portions 9 heated around the magnetically reproducible temperature, the two magnetic films have different polarities, and the magnetization directions of the two magnetic films are opposite. Consequently, the leaking magnetic fluxes from the two magnetic films are cancelled out with each other, thereby reducing crosstalk caused by the leaking magnetic fluxes from the peripheral track portions 9 heated during reproduction.

Further, because the magnetic layer 21 is of the double-layer structure including the magnetic materials coupled to each other by means of exchanged coupling: the first magnetic film 23 and second magnetic film 22, the magnetic reproducing head 6 detects a vector sum of the magnetic flux from each magnetic film as the magnetic flux from the magnetic recording medium having the magnetic layer 21.

Thus, by adjusting the product Ms·d, where Ms is a magnitude of the magnetization and d is a film thickness of each magnetic film, the leaking magnetic fluxes from the peripheral track portions 9 can be cancelled out completely (reduced to 0) regardless of the size of a space between the magnetic reproducing head 6 and each magnetic film. In other words, crosstalk from the peripheral track portions 9 can be reduced to ideal 0 (zero).

Here, in order to cancel out the leaking magnetic fluxes from the peripheral track portions 9 completely during reproduction by adjusting the product Ms·d in each magnetic film, at least the following relational expression (10) should be established in the heated portion:

$$Ms1 \cdot d1 < Ms2 \cdot d2 \tag{10}$$

where Ms1 is the magnetization and d1 is a film thickness of the first magnetic film 23 which is the magnetic film placed closer to the magnetic reproducing head 6, and Ms2 is the magnetization and d2 is a film thickness of the other second magnetic film 22.

By arranging the magnetic layer 21 in such a manner that the product (Ms1·d1) of the first magnetic film 23 which is placed closer to the magnetic reproducing head 6 becomes smaller than the product (Ms2·d2) of the second magnetic film 22 which is placed farther from the magnetic reproducing head 6, the adverse effects of the leaking magnetic fluxes from the two magnetic films having the opposite magnetization directions in the heated portions (peripheral track portions 9) can be cancelled out completely (reduced to 0) at the magnetic flux detecting position (magnetic reproducing track portion 8) by the magnetic reproducing head 6.

In order to further reduce crosstalk from the peripheral track portions 9, the following relational expression (11) may be established in addition to the relational expression (10) above:

$$\sigma w/2Ms1 \cdot d1 - \sigma w/2Ms2 \cdot d2 > Hc1 + Hc2 \tag{11}$$

where Hc1 is a coercive force of the first magnetic film 23 which is placed closer to the magnetic reproducing head 6; Hc2 is a coercive force of the second magnetic film 22 which is placed farther from the magnetic reproducing head 6; and σw is interface magnetic domain wall energy stored at the boundary between the two magnetic films.

When the relational expression (11) above is established, the peripheral track portions 9 adjacent to the magnetic reproducing track portion 8 are heated during magnetic reproduction, and the hysteresis curve of the overall magnetization of the recording medium in the peripheral track portions 9 is the one shown in FIG. 11(a). Capital letters A and B represent states of the residual magnetization of the magnetic recording medium when the relational expression (11) above is established, which respectively correspond to "1" and "0" of the recorded binary information. Hereinafter, capital letters A and B are defined as above, and the explanation thereof is omitted.

Thus, in this case, the magnetization directions of the two magnetic films forming the magnetic layer 21 of the magnetic recording medium in the peripheral track portions 9 heated during magnetic reproduction are illustrated in FIG. 11(b) as the states A and B. Consequently, the adverse effects from the first magnetic film 23 and second magnetic film 22 forming the magnetic layer 21 can be cancelled out with each other, thereby making it possible to reduce crosstalk caused by the leaking magnetic fluxes from the heated peripheral track portions 9 in the magnetic recording medium.

Further, in order to further reduce crosstalk from the peripheral track portions 9, the following relational expressions (12) and (13) may be established in addition to the relational expression (10) above:

$$Hc1 < \sigma w/2Ms1 \cdot d1 \tag{12}$$

$$Hc1 + Hc2 > \sigma w/2Ms1 \cdot d1 - \sigma w/2Ms2 \cdot d2 > Hc1 - Hc2 \tag{13}$$

Figure 12:
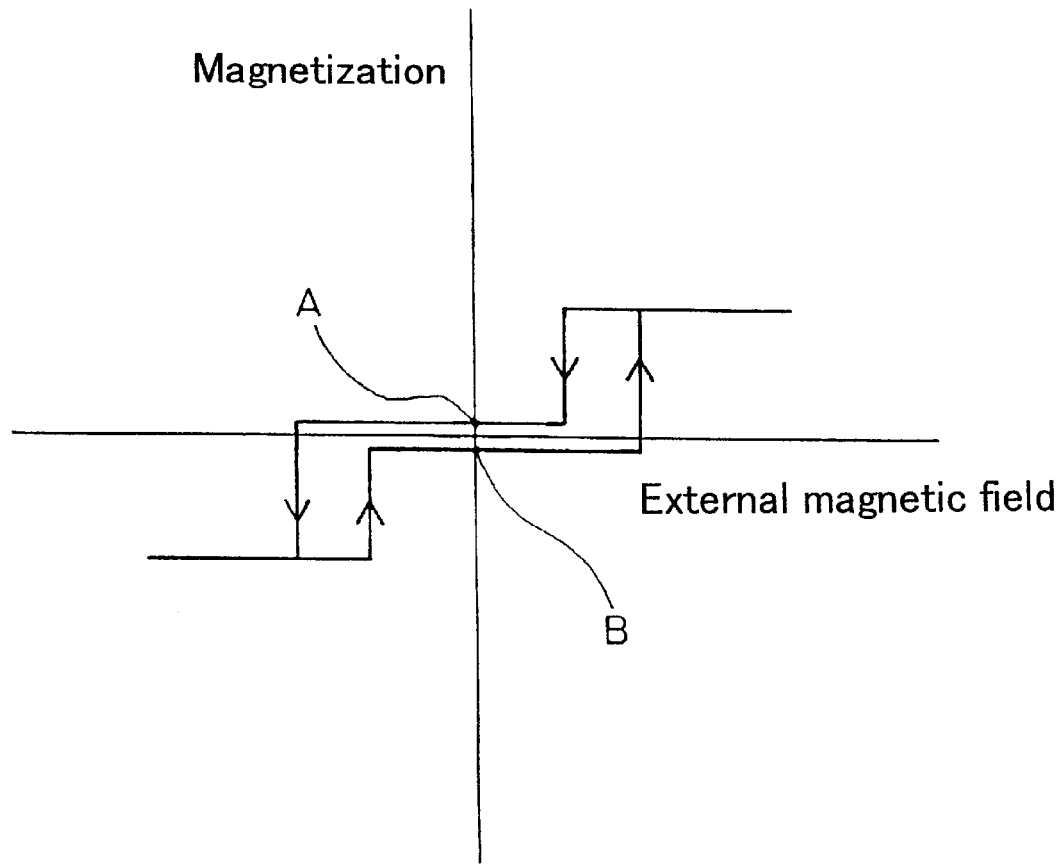
FIGS. 12(a) and 12(b) show an example of the magnetization states of the magnetic recording medium of FIG. 10 when heated.
Figure 12:
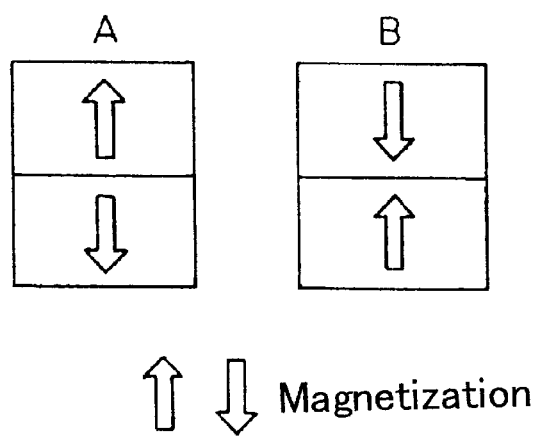

According to the magnetic recording medium, in which all of the relational expressions (10), (12), and (13) are established, the hysteresis curve of the overall magnetization of the recording medium in the heated peripheral track portions 9 during magnetic reproduction is the one shown in FIG. 12(*a*).

Thus, in case of the above magnetic recording medium, the magnetization directions of the two magnetic films forming the magnetic layer 21 of the magnetic recording medium in the heated portions during magnetic reproduction are illustrated in FIG. 12(*b*) as the states A and B. Consequently, the adverse effects from the two magnetic films forming the magnetic layer 21 can be cancelled out with each other, thereby making it possible to reduce crosstalk caused by the leaking magnetic fluxes from the heated portions in the magnetic recording medium.

In order to further reduce the crosstalk from the peripheral track portions 9, the following relational expressions (14) and (15) may be established in addition to the relational expression (10) above:

$$Hc2 < \sigma w/2Ms2 \cdot d2 \tag{14}$$

$$Hc1 - Hc2 > \sigma w/2Ms1 \cdot d1 - \sigma w/2Ms2 \cdot d2 \tag{15}.$$

Figure 13:
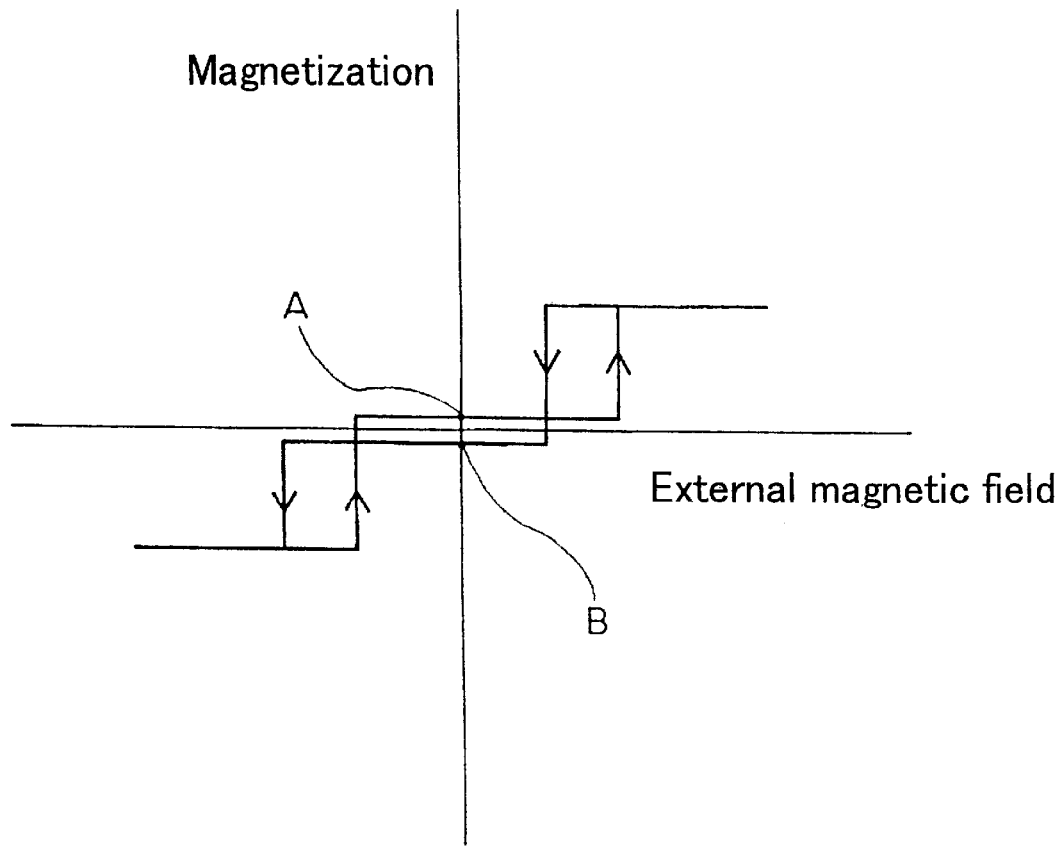
FIGS. 13(a) and 13(b) show an example of the magnetization states of the magnetic recording medium of FIG. 10 when heated.
Figure 13:
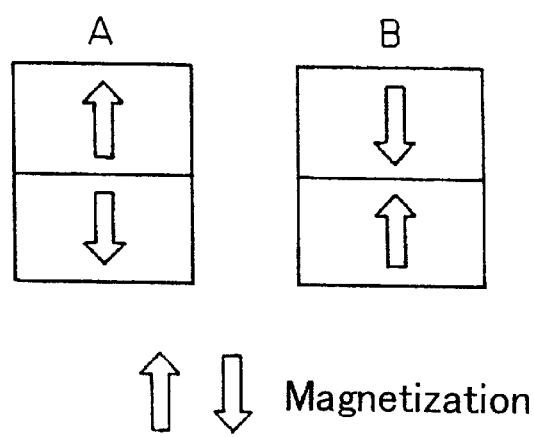

According to the magnetic recording medium, in which all of the relational expressions (10), (14) and (15) above are established, the hysteresis curve of the overall magnetization of the recording medium in the heated peripheral track portions 9 during magnetic reproduction is the one shown in FIG. 13(*a*).

Thus, in case of the above magnetic recording medium, the magnetization directions of the two magnetic films forming the magnetic layer 21 of the magnetic recording medium in the peripheral track portions 9 heated during magnetic reproduction are illustrated in FIG. 13(*b*) as the states A and B. Consequently, the adverse effects from the two magnetic films forming the magnetic layer 21 can be cancelled out with each other, thereby making it possible to reduce crosstalk caused by the leaking magnetic fluxes from the heated portions in the magnetic recording medium.

The foregoing explained, with the relational expressions above, the hysteresis curves of the magnetization in the heated portions (the peripheral track portions 9 herein) in the magnetic recording medium. The following will explain the hysteresis curves of the magnetization in the portion (the magnetic reproducing track portion 8 herein) having approximately room temperature in the magnetic recording medium.

In order to further reduce the crosstalk from the peripheral track portions 9 and intensify the reproducing signal, a combination of the relational expressions (12) and (13) above or a combination of the relational expressions (14) and (15) above must be established in the heated portions, and either of the following relational expressions (16) and (17) must be established around room temperature:

$$Hc2 - Hc1 > \sigma w/2Ms1 \cdot d1 + \sigma w/2Ms2 \cdot d2 \tag{16}$$

$$(Ms1 \cdot d1 \leq Ms2 \cdot d2)$$

$$Hc1 - Hc2 > \sigma w/2Ms1 \cdot d1 + \sigma w/2Ms2 \cdot d2 \tag{17}$$

$$(Ms1 \cdot d1 \geq Ms2 \cdot d2).$$

According to the magnetic recording medium satisfying the above conditions, by establishing a combination of the relational expressions (12) and (13) above or a combination of the relational expressions (14) and (15) above, crosstalk, caused by the leaking magnetic fluxes from the peripheral track portions 9 heated during magnetic reproduction, can be reduced.

Figure 14:
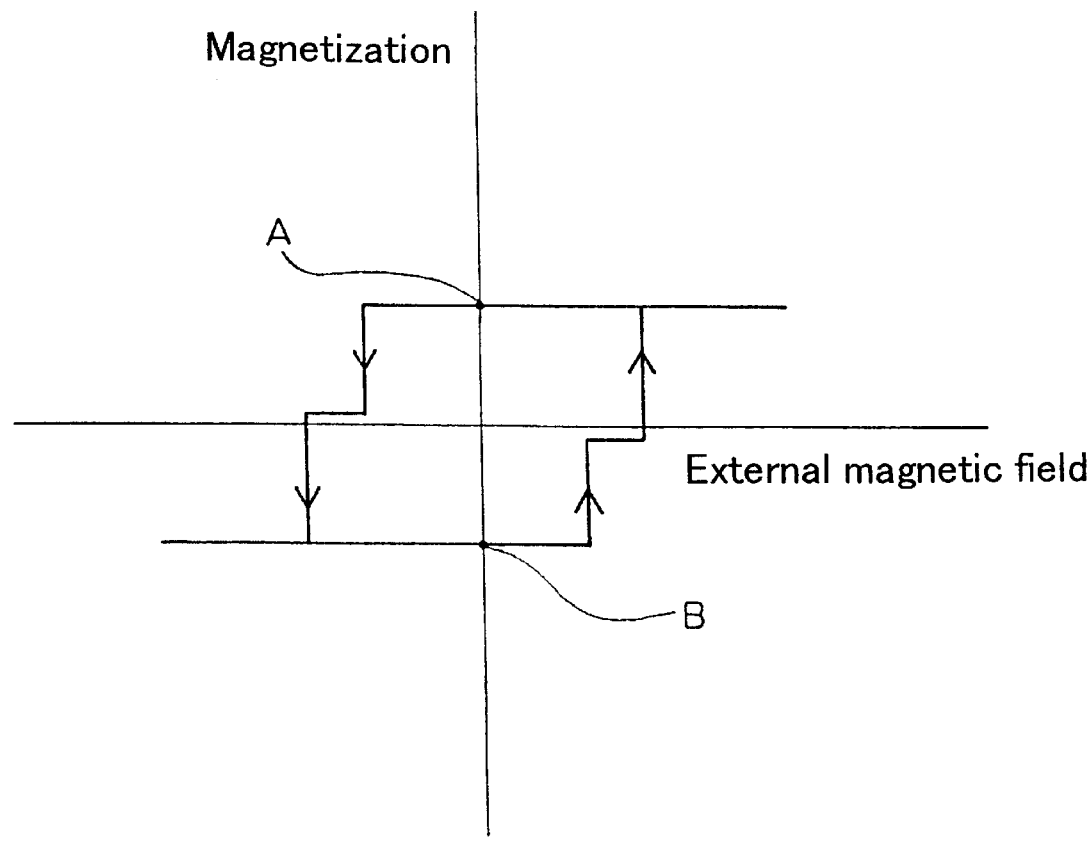
FIGS. 14(a) and 14(b) show an example of the magnetization states of the magnetic recording medium of FIG. 10 around room temperature.
Figure 14:
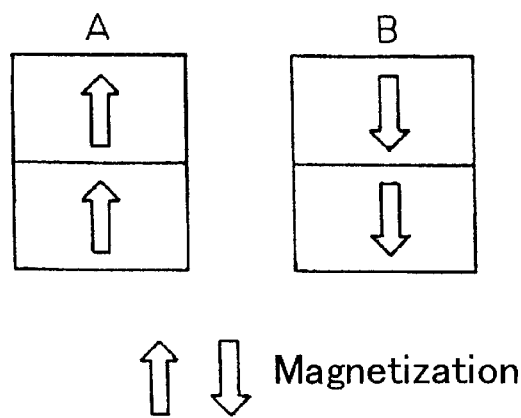

In addition, by establishing the relational expression (16) or (17) above, the hysteresis curve of the overall magnetization of the magnetic recording medium in the magnetic reproducing track portion 8 having approximately room temperature becomes as the one shown in FIG. 14(*a*).

Thus, in case of the above magnetic recording medium, the magnetization directions of the two magnetic films forming the magnetic layer 21 of the magnetic recording medium in the magnetic reproducing track portion 8 having approximately room temperature during magnetic reproduction are illustrated in FIG. 14(*b*) as the states A and B. Consequently, the magnetization directions of the two magnetic films forming the magnetic layer 21 are aligned in the same direction, and the magnetization of each magnetic film is intensified by the other. Thus, the leaking magnetic fluxes from the magnetic reproducing track portion 8 having approximately room temperature are increased, thereby making it possible to obtain a large reproducing signal.

In order to further reduce crosstalk from the peripheral track portions 9 and intensify the reproducing signal, a combination of the relational expressions (12) and (13) above, or a combination of the relational expressions (14) and (15) above must be established in the heated portions, and the following relational expression (18) must be established in the magnetic reproducing track portion 8 having approximately room temperature:

$$|Hc1 - Hc2| < \sigma w/2Ms1 \cdot d1 + \sigma w/2Ms2 \cdot d2 \tag{18}.$$

According to the magnetic recording medium satisfying the above conditions, crosstalk, caused by the leaking magnetic fluxes from the heated peripheral track portions 9 during magnetic reproduction, can be reduced.

Figure 15:
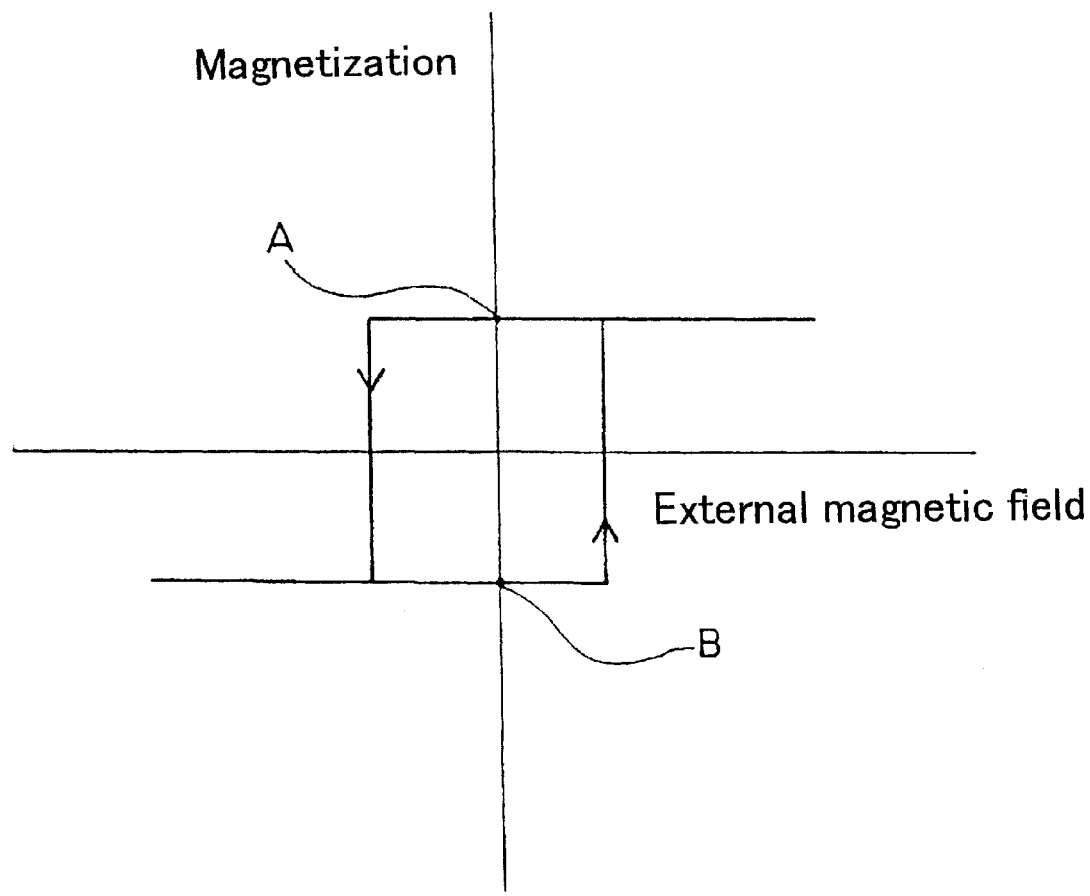
FIGS. 15(a) and 15(b) show an example of the magnetization states of the magnetic recording medium of FIG. 10 around room temperature.
Figure 15:
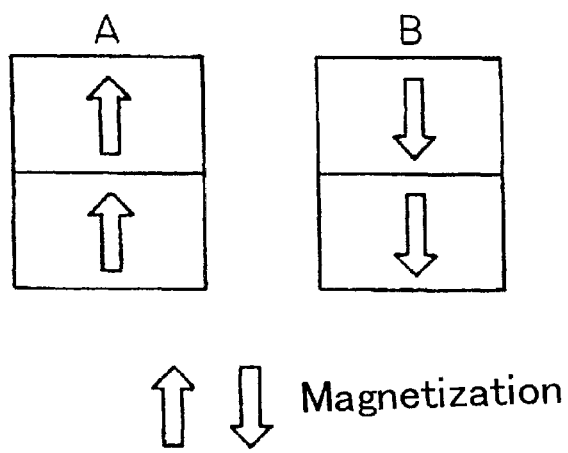

In addition, by establishing the relational expression (18) above, the hysteresis curve of the magnetization of the magnetic recording medium in the magnetic reproducing track portion 8 becomes as the one shown in FIG. 15(*a*).

Thus, in case of the above magnetic recording medium, the magnetization directions of the two magnetic films forming the magnetic layer 21 of the magnetic recording medium in the magnetic reproducing track portion 8 having approximately room temperature during magnetic reproduction are illustrated in FIG. 15(*b*) as the states A and B. Consequently, the magnetization directions of the two magnetic films forming the magnetic layer 21 are aligned in the same direction, and the magnetization of each magnetic film is intensified by the other. Thus, the leaking magnetic fluxes from the magnetic reproducing track portion 8 having approximately room temperature are increased, thereby making it possible to obtain a large reproducing signal.

The following will explain an example of the magnetic layer 21 in the magnetic recording medium of the present embodiment. Here, the function and effect of the magnetic layer 21 will be explained in a case where the magnetic layer 21 includes the first magnetic film 23 made of a RE-rich rare earth transition metal amorphous alloy having its magnetic compensation temperature at 90° C. and a film thickness of approximately 55 nm with a composition of $(Tb_{0.75}Dy_{0.25})_{0.34}(Fe_{0.72}Co_{0.28})_{0.66}$, and the second magnetic film 22 made of a RE-rich rare earth transition metal amorphous alloy having its magnetic compensation temperature at 240° C. or above and a film thickness of approximately 45 nm with a composition of $(Gd_{0.50}Dy_{0.50})_{0.31}(Fe_{0.78}Co_{0.22})_{0.69}$.

Figure 16:
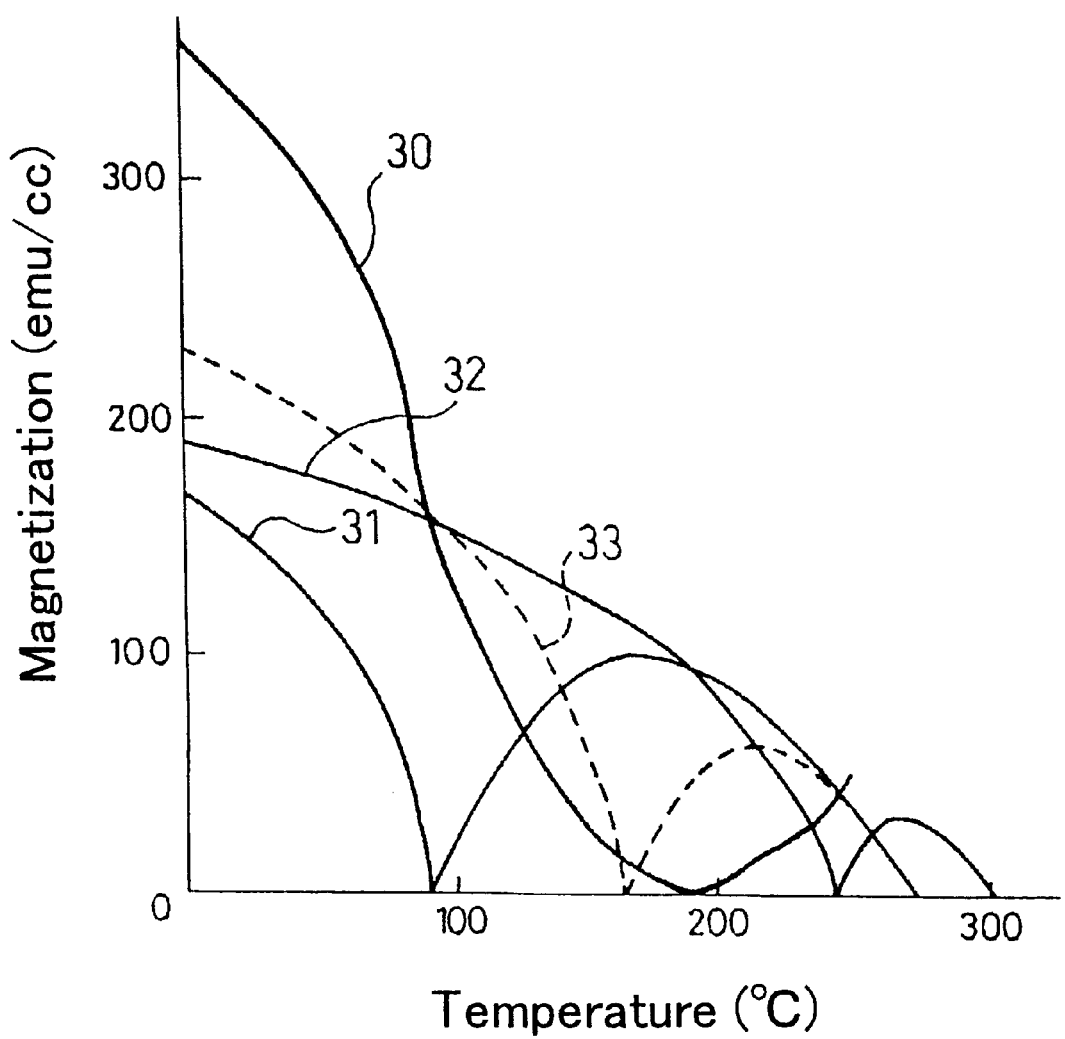
FIG. 16 shows a graph explaining magnetic characteristics of the magnetic recording medium of FIG. 10.

FIG. 16 is a graph showing the temperature dependency of the magnetization Ms of the magnetic layer 21 of the above magnetic recording medium.

In the graph of FIG. 16, a curve 30 indicates the temperature dependency of the magnetization Ms of the magnetic layer 21; a curve 31 indicates the temperature dependency of the magnetization Ms of the RE-rich first magnetic film 23 alone which forms the magnetic layer 21; a curve 32 indicates the temperature dependency of the magnetization Ms of the RE-rich second magnetization 22 alone which forms the magnetic layer 21; and for the purpose of comparison, a curve 33 indicates the temperature dependency of the magnetization Ms of a typical example of the magnetic recording medium having a film thickness of approximately 100 nm and a composition of $(Tb_{0.75}Dy_{0.25})_{0.35}(Fe_{0.72}Co_{0.28})_{0.65}$.

The following will show the magnetic properties of each magnetic film around room temperature:

coercive force of 1st magnetic film 23(Hc1): 8.4 kOe magnetization of 1st magnetic film 23 (Ms1): 170 emu/cc film thickness of 1st magnetic film 23 (d1): 55 nm coercive force of 2nd magnetic film 22 (Hc2): 400 Oe magnetization of 2nd magnetic film 22(Ms2): 190 emu/cc film thickness of 2nd magnetic film 22 (d2): 45 nm interface magnetic domain wall energy ($\sigma w$): 1.8 erg/cm$^2$ Thus, it is understood that the relational expression (17) above: $Hc1-Hc2=8$ kOe$>\sigma w/2Ms1 \cdot d1+\sigma w/2Ms2 \cdot d2=2.1$ kOe, $Ms1 \cdot d1=0.935$ memu/cm$^2>Ms2 \cdot d2=0.855$ memu/cm$^2$, is established.

In other words, the magnetization direction of the first magnetic film 23 and that of the second magnetic film 22 are the same in parallel, and the leaking magnetic fluxes from the magnetic reproducing track portion 8 are intensified with each other, thereby making it possible to obtain a large reproducing signal from the magnetic reproducing head 6. In practice, the curve 30 indicating the overall magnetization of the magnetic recording medium in the graph of FIG. 16 shows a value equivalent to a sum of the magnetization of the first magnetic film 23 and that of the second magnetic film 22 around room temperature, namely, the temperature of the magnetic reproducing track portion 8. It is understood that the magnetization (magnitude) at this point is larger than that shown in the curve 33 indicating the magnetization of the light assist type magnetic recording material of a conventional single-layer structure.

Next, the following show the magnetic properties of each magnetic film in the peripheral track portions 9 heated by the light beam 7. The heating temperature is set such that each magnetic film has a different polarity, so that the adverse effect of the magnetization from each magnetic film can be cancelled out. The following shows the magnetic properties when the heating temperature is set to approximately 160° C.:

coercive force of 1st magnetic film 23(Hc1): 10 kOe magnetization of 1st magnetic film 23 (Ms1): 100 emu/cc film thickness of 1st magnetic film 23 (d1): 55 nm coercive force of 2nd magnetic film 22 (Hc2): 500 Oe magnetization of 2nd magnetic film 22 (Ms2): 125 emu/cc film thickness of 2nd magnetic film 22 (d2): 45 nm interface magnetic domain wall energy ($\sigma w$):0.6 erg/cm$^2$ Thus, it is understood that the relational expression (10) above: $Ms1 \cdot d1=0.55$ memu/cm$^2<Ms2 \cdot d2=0.56$ memu/cm$^2$; and the relational expression (14) above: $Hc2=500$ Oe$<\sigma w/2Ms2 \cdot d2=533$ e; and the relational expression (15) above: $Hc1-Hc2=9500$ Oe$>\sigma w/2Ms1 \cdot d1-\sigma w/2Ms2 \cdot d2=12$ Oe, are all established.

In other words, the magnetization direction of the first magnetic film 23 and that of the second magnetic film 22 are opposite in parallel, and the adverse effects on the magnetic reproducing head 6 from the two magnetic films are cancelled out with each other. In practice, the curve 30 indicating the overall magnetization of the magnetic recording medium in the graph of FIG. 16 shows a small value around 160° C., namely the heating temperature. The foregoing reveals that the adverse effects of crosstalk from the peripheral track portions 9 adjacent to the heated magnetic reproducing track portion 8 during reproduction can be reduced.

Further, the comparison with the curve 33 indicating the characteristics of the light assist type magnetic recording medium of the conventional single-layer structure reveals that the magnetic layer 21 attains a significant effect of reducing the total magnetization around the heating temperature, and has good resistance to a temperature change around the heating temperature. It is preferable to set the temperature at the heated portion to a range between 120° C. and 200° C. by taking an output from the semiconductor laser used as a light source into consideration. Also, it is preferable to set the temperature at the heated portion in such a manner that the magnetization direction of the first magnetic film 23 and that of the second magnetic film 22 are opposite and the adverse effects of the leaking magnetic fluxes from the two magnetic films are cancelled out with each other within the above-specified temperature range.

The present embodiment used TbDyFeCo and GdDyFeCo as the rare earth transition metal amorphous film. It should be appreciated, however, that the rare earth transition metal amorphous film is not limited to the foregoing, and other kinds of rare earth transition metal alloy series, such as TbCo, TbFeCo, DyFeCo, GdTbFe, GdDyFe, GdTbFeCo, are also available.

Of all the rare earth transition metal alloy series, a series containing Tb or Dy which induces large perpendicular magnetic anisotropy can attain a large coercive force and excellent bit stability. Also, a series containing Gd having large magnetic moment is advantageous in increasing magnetization, thereby improving the reproducing performance.

Further, the present embodiment explained the magnetic recording medium, in which the relational expression (17) above is established around room temperature, and the relational expressions (10), (14), and (15) above are established around the heating temperature. It should be appreciated, however, that the magnetic recording medium is not limited to the foregoing.

For example, the aforementioned relational expressions may be combined. More specifically, it can be readily understood from the magnetization curve that the magnetic recording medium can include a magnetic film, in which the relational expression (16) or (18) above is established around room temperature, and a combination of the relational expressions (10) and (11) above or a combination of the relational expressions (10), (12), and (13) above is established around the heating temperature.

In particular, a rare earth transition metal amorphous alloy film of various combinations can satisfy the above-specified conditions, because the magnetic properties of amorphous can be designed in various manners by sequentially changing a composition of the elements.

Also, the present embodiment explained the magnetic layer 21 of the double-layer structure. However, an intermediate layer may be inserted between the two magnetic films to adjust the exchanged coupling force. By inserting the intermediate layer, the magnetic recording material can be designed more flexibly, and therefore, the light assist magnetic recording and reproducing characteristics can be readily improved and optimized.

For example, the intermediate layer may be inserted between the two magnetic films to reduce the exchanged coupling force therebetween as previously mentioned. In this case, the magnetization inverting magnetic field in the magnetic layer can be made smaller as an effect. In addition, in case that the intermediate layer is made of materials based on the rare earth transition metals, GdFe or GdFeCo having small anisotropy is used, for example.

However, the use of the intermediate layer is not limited to weaken the exchanged coupling force between the two magnetic films as described above, and the intermediate layer can be inserted to increase the exchanged coupling force as well.

As has been discussed, the magnetic recording medium of the present invention is a magnetic recording medium, from which recorded information is reproduced by a magnetic reproducing head with heating of a target reproducing track, and the medium has at least a magnetic layer including two magnetic films coupled to each other by means of exchanged interaction of the magnetic materials. One of the magnetic films forming the magnetic layer may be made of a ferrimagnetic material having a magnetic compensation temperature, and the magnetization directions of the two magnetic films are opposite in a portion having approximately room temperature and the same in a portion heated to a magnetically reproducible temperature during reproduction.

According to the above arrangement, when the information is reproduced by heating a target reproducing track (hereinafter, referred to as the reproducing track) with a microscopic heat source, such as a laser beam, the magnetization directions of the two magnetic films forming the magnetic layer are the same in the portion (heated portion) heated to the magnetically reproducible temperature in the reproducing track. Thus, overall magnetization of the magnetic recording medium is a sum of the magnetization of each magnetic film. Consequently, the leaking magnetic fluxes from the heated portion are increased, thereby making it possible to obtain a large reproducing signal.

Moreover, because a portion other than the heated portion in the reproducing track has approximately room temperature during reproduction, the magnetization directions of the two magnetic films in that portion are opposite, and the magnetization in each magnetic film is cancelled out by the other. Thus, because the overall magnetization of the magnetic recording medium can be reduced to almost 0, crosstalk, caused by the leaking magnetic fluxes from the portion other than the heated portion in the reproducing track, that is, a track adjacent to the reproducing track, can be reduced.

Hence, according to the magnetic recording medium of the above arrangement, not only can crosstalk from the track adjacent to the reproducing track be reduced, but also a reproducing signal can be intensified. Consequently, the S/N of the reproducing signal can be improved significantly.

In other words, by providing the light assist type magnetic recording medium with a magnetic layer of the double-layer structure having its compensation temperature between room temperature and reproducible temperature, not only can noises from the adjacent track be suppressed, but also a magnetization signal can be intensified during reproduction.

In addition, when the recorded information is reproduced from the magnetic recording medium, the magnetic reproducing head detects a vector sum of the magnetic flux from each magnetic film forming the magnetic layer as the magnetic flux from the magnetic recording medium. Thus, by adjusting a product of the magnetization and a film thickness of each magnetic film, the leaking magnetic fluxes can be cancelled out completely regardless of the size of a space between the magnetic reproducing head and each magnetic film. The relation between the magnetization and film thickness of each magnetic film is specified in the following magnetic recording medium.

The magnetic recording medium of the present invention may be arranged in such a manner that the following relational expression is established in the portion having approximately room temperature in the magnetic layer:

$$Ms1 \cdot d1 < Ms2 \cdot d2$$

where $Ms1$ is the magnetization and $d1$ is a film thickness of the magnetic film placed closer to the magnetic reproducing head, and $Ms2$ is the magnetization and $d2$ is a film thickness of the other magnetic film.

According to the above arrangement, the product of the magnetization $Ms1$ and film thickness $d1$ of the magnetization film placed closer to the magnetic reproducing head is set smaller than the product of the magnetization $Ms2$ and film thickness $d2$ of the other magnetization film. Thus, the adverse effects of the leaking magnetic fluxes from the two magnetic films having the opposite magnetization directions in the portion having approximately room temperature in the magnetic layer can be cancelled out completely (reduced to 0) at the magnetic flux detected position by the magnetic reproducing head. In short, crosstalk from the track adjacent to the reproducing track can be reduced.

The magnetic recording medium of the present invention may be arranged in such a manner that the following relational expression is established in the portion having approximately room temperature in the magnetic layer:

$$\sigma w/2Ms1 \cdot d1 - \sigma w/2Ms2 \cdot d2 > Hc1 + Hc2$$

where $Ms1$ is the magnetization, $d1$ is a film thickness, and $Hc1$ is a coercive force of the magnetic film placed closer to the magnetic reproducing head; $Ms2$ is the magnetization, $d2$ is a film thickness, and $Hc2$ is a coercive force of the other magnetic film; and $\sigma w$ is interface magnetic domain wall energy stored at the boundary of the two magnetic films.

According to the above arrangement, the adverse effects from the two magnetic films forming the magnetic layer can be cancelled out with each other in the portion having approximately room temperature, thereby making it possible to reduce crosstalk caused by the leaking magnetic fluxes from the track adjacent to the reproducing track of the magnetic recording medium.

The magnetic recording medium of the present invention may be arranged in such a manner that two following relational expressions are established concurrently in the portion having approximately room temperature in the magnetic layer:

$$Hc1 < \sigma w/2Ms1 \cdot d1$$

$$Hc1 + Hc2 > \sigma w/2Ms1 \cdot d1 - \sigma w/2Ms2 \cdot d2 > Hc1 - Hc2$$

where $Ms1$ is the magnetization, $d1$ is a film thickness, and $Hc1$ is a coercive force of the magnetic film placed closer to the magnetic reproducing head; $Ms2$ is the magnetization, $d2$ is a film thickness, and $Hc2$ is a coercive force of the other magnetic film; and $\sigma w$ is interface magnetic domain wall energy stored at the boundary of the two magnetic films.

According to the above arrangement, the adverse effects from the two magnetic films forming the magnetic layer can be cancelled out with each other in the portion having approximately room temperature, thereby making it possible to reduce crosstalk caused by the leaking magnetic fluxes from the track adjacent to the reproducing track of the magnetic recording medium.

The magnetic recording medium of the present invention may be arranged in such a manner that the two following relational expressions are established concurrently in the portion having approximately room temperature in the magnetic layer:

$$Hc2 < \sigma w / 2Ms2 \cdot d2$$

$$Hc1 - Hc2 > \sigma w / 2Ms1 \cdot d1 - \sigma w / 2Ms2 \cdot d2$$

where Ms1 is the magnetization, d1 is a film thickness, and Hc1 is a coercive force of the magnetic film placed closer to the magnetic reproducing head; Ms2 is the magnetization, d2 is a film thickness, and Hc2 is a coercive force of the other magnetic film; and σw is interface magnetic domain wall energy stored at the boundary of the two magnetic films.

According to the above arrangement, by concurrently establishing the above two relational expressions in the portion having approximately room temperature in the magnetic layer, the magnetization directions of the two magnetic films forming the magnetic layer becomes opposite, thereby making it possible to cancel out the adverse effects from the two magnetic films. Consequently, crosstalk, caused by the leaking magnetic fluxes from the portion having approximately room temperature in the magnetic layer, can be reduced. In short, crosstalk from the track adjacent to the reproducing track can be reduced.

The magnetic recording medium of the present invention may be arranged in such a manner that one of the two following relational expressions is established in the portion heated to the magnetically reproducible temperature in the magnetic layer:

$$Hc2 - Hc1 > \sigma w / 2Ms1 \cdot d1 + \sigma w / 2Ms2 \cdot d2, \ (Ms1 \cdot d1 \leq Ms2 \cdot d2)$$

$$Hc1 - Hc2 > \sigma w / 2Ms1 \cdot d1 + \sigma w / 2Ms2 \cdot d2, \ (Ms1 \cdot d1 \geq Ms2 \cdot d2)$$

where Ms1 is the magnetization, d1 is a film thickness, and Hc1 is a coercive force of the magnetic film placed closer to the magnetic reproducing head; Ms2 is the magnetization, d2 is a film thickness, and Hc2 is a coercive force of the other magnetic film; and σw is interface magnetic domain wall energy stored at the boundary of the two magnetic films.

According to the above arrangement, by establishing either of the above two relational expressions, the magnetization directions of the two magnetic films forming the magnetic layer in the portion (reproducing portion) heated to the magnetically reproducible temperature becomes the same, and therefore, the magnetization of each magnetic film is intensified by the other. Consequently, the leaking magnetic fluxes from the reproducing portion are increased, thereby making it possible to obtain a large reproducing signal.

The magnetic recording medium of the present invention may be arranged in such a manner that the following relational expression is established in the portion heated to the magnetically reproducible temperature in the magnetic layer:

$$|Hc1 - Hc2| < \sigma w / 2Ms1 \cdot d1 + \sigma w / 2Ms2 \cdot d2$$

where Ms1 is the magnetization, d1 is a film thickness, and Hc1 is a coercive force of the magnetic film placed closer to the magnetic reproducing head; Ms2 is the magnetization, d2 is a film thickness, and Hc2 is a coercive force of the other magnetic film; and σw is interface magnetic domain wall energy stored at the boundary of the two magnetic films.

According to the above arrangement, the magnetization directions of the two magnetic films forming the magnetic layer are the same in the portion (reproducing portion) heated to the magnetically reproducible temperature, and the magnetization of each magnetic film is intensified by the other. Consequently, the leaking magnetic fluxes from the reproducing portion in the magnetic layer are increased, thereby making it possible to obtain a large reproducing signal.

The magnetic recording medium of the present invention is a magnetic recording medium, from which recorded information is reproduced by the magnetic reproducing head with heating of a track adjacent to a reproducing track, and the medium has at least a magnetic layer including two magnetic films which are coupled by means of exchanged interaction of the magnetic materials. One of the magnetic films forming the magnetic layer may be made of a ferrimagnetic material having a magnetic compensation point, and the magnetization directions of the two magnetic films are the same in a portion having approximately room temperature, and opposite in a heated portion in a track adjacent to a reproducing track during reproduction.

According to the above arrangement, when the information is reproduced magnetically by heating the track adjacent to the reproducing track with a microscopic heat source, such as a laser beam, the magnetization directions of the two magnetic films in the heated portion in the track adjacent to the reproducing track are opposite, and the magnetization of each magnetic film is cancelled out by the other. Thus, because the overall magnetization of the magnetic recording medium can be reduced to almost 0, crosstalk produced by the leaking magnetic fluxes from the heated portion in the track adjacent to the reproducing track, can be reduced.

Further, because the reproducing track has approximately room temperature, the magnetization directions of the two magnetic films are the same, and the overall magnetization of the magnetic recording medium is a sum of the magnetization of each magnetic film. Consequently, the leaking magnetic fluxes from the portion having approximately room temperature in the reproducing track of the magnetic recording medium is increased, thereby making it possible to obtain a large reproducing signal.

Thus, according to the magnetic recording medium of the above arrangement, not only can crosstalk from the track adjacent to the reproducing track be reduced, but also a reproducing signal can be intensified. Consequently, the S/N of the reproducing signal can be improved significantly.

When the recorded information is reproduced from the magnetic recording medium, the magnetic reproducing head detects a vector sum of the magnetic flux from each magnetic film forming the magnetic layer as the magnetic flux from the magnetic recording medium. Thus, by adjusting a product of the magnetization and a film thickness of each magnetic film, the leaking magnetic fluxes can be cancelled out completely regardless of the size of a space between the magnetic reproducing head and each magnetic film. The relation between the magnetization and the film thickness of each magnetic film is specified in the following magnetic recording medium.

The magnetic recording medium of the present invention may be arranged in such a manner that the following relational expression is established in the heated portion in the magnetic layer:

$$Ms1 \cdot d1 < Ms2 \cdot d2$$

where Ms1 is the magnetization and d1 is a film thickness of the magnetic film placed closer to the magnetic reproducing head, and Ms2 is the magnetization and d2 is a film thickness of the other magnetic film.

According to the above arrangement, the product of the magnetization Ms1 and film thickness d1 of the magnetization film placed closer to the magnetic reproducing head is set smaller than the product of the magnetization Ms2 and film thickness d2 of the other magnetization film in the heated portion of the magnetic layer. Thus, the adverse effects of the leaking magnetic fluxes from the two magnetic films having the opposite magnetization directions in the heated portion in the magnetic layer can be cancelled out completely (reduced to 0) at the magnetic flux detected position by the magnetic reproducing head. In short, crosstalk from the track adjacent to the reproducing track can be reduced.

The magnetic recording medium of the present invention may be arranged in such a manner that the following relational expression is established in the heated portion in the magnetic layer:

$$\sigma w/2Ms1 \cdot d1 - \sigma w/2Ms2 \cdot d2 > Hc1 + Hc2$$

where Ms1 is the magnetization, d1 is a film thickness, and Hc1 is a coercive force of the magnetic film placed closer to the magnetic reproducing head; Ms2 is the magnetization, d2 is a film thickness, and Hc2 is a coercive force of the other magnetic film; and σw is interface magnetic domain wall energy stored at the boundary of the two magnetic films.

According to the above arrangement, the adverse effects from the two magnetic films forming the magnetic layer can be cancelled out with each other in the heated portion, thereby making it possible to reduce crosstalk caused by the leaking magnetic fluxes from the track adjacent to the reproducing track of the magnetic recording medium. The magnetic recording medium of the present invention may be arranged in such a manner that the two following relational expressions are established concurrently in the heated portion in the magnetic layer:

$$Hc1 < \sigma w/2Ms1 \cdot d1$$

$$Hc1 + Hc2 > \sigma w/2Ms1 \cdot d1 - \sigma w/2Ms2 \cdot d2 > Hc1 - Hc2$$

where Ms1 is the magnetization, d1 is a film thickness, and Hc1 is a coercive force of the magnetic film placed closer to the magnetic reproducing head; Ms2 is the magnetization, d2 is a film thickness, and Hc2 is a coercive force of the other magnetic film; and σw is interface magnetic domain wall energy stored at the boundary of the two magnetic films.

According to the above arrangement, the adverse effects from the two magnetic films forming the magnetic layer can be cancelled out with each other in the heated portion, thereby making it possible to reduce crosstalk caused by the leaking magnetic fluxes from the track adjacent to the reproducing track of the magnetic recording medium.

The magnetic recording medium of the present invention may be arranged in such a manner that the two following relational expressions are established concurrently in the heated portion in the magnetic layer:

$$Hc2 < \sigma w/2Ms2 \cdot d2$$

$$Hc1 - Hc2 > \sigma w/2Ms1 \cdot d1 - \sigma w/2Ms2 \cdot d2$$

where Ms1 is the magnetization, d1 is a film thickness, and Hc1 is a coercive force of the magnetic film placed closer to the magnetic reproducing head; Ms2 is the magnetization, d2 is a film thickness, and Hc2 is a coercive force of the other magnetic film; and σw is interface magnetic domain wall energy stored at the boundary of the two magnetic films.

According to the above arrangement, by establishing the above two relational expressions concurrently in the heated portion in the track adjacent to the track in the magnetic layer, the magnetization directions of the two magnetic films forming the magnetic layer become opposite, thereby making it possible to cancel out the adverse effects from the two magnetic films. Consequently, crosstalk, caused by the leaking magnetic fluxes from the heated portion in the track adjacent to the reproducing track, can be reduced.

The magnetic recording medium of the present invention may be arranged in such a manner that one of the following relational expressions is established in the portion having approximately room temperature in the magnetic layer:

$$Hc2 - Hc1 > \sigma w/2Ms1 \cdot d1 + \sigma w/2Ms2 \cdot d2, \ (Ms1 \cdot d1 \leq Ms2 \cdot d2)$$

$$Hc1 - Hc2 > \sigma w/2Ms1 \cdot d1 + \sigma w/2Ms2 \cdot d2, \ (Ms1 \cdot d1 \geq Ms2 \cdot d2)$$

where Ms1 is the magnetization, d1 is a film thickness, and Hc1 is a coercive force of the magnetic film placed closer to the magnetic reproducing head; Ms2 is the magnetization, d2 is a film thickness, and Hc2 is a coercive force of the other magnetic film; and σw is interface magnetic domain wall energy stored at the boundary of the two magnetic films.

According to the above arrangement, by establishing either of the above two relational expressions, the magnetization directions of the two magnetic films in the portion having approximately room temperature become the same, and therefore, the magnetization of each magnetic film is intensified by the other. Consequently, the leaking magnetic fluxes from the portion having approximately room temperature are increased, thereby making it possible to obtain a large reproducing signal.

The magnetic recording medium of the present invention may be arranged in such a manner that the following relational expression is established in the portion having approximately room temperature in the magnetic layer:

$$|Hc1 - Hc2| < \sigma w/2Ms1 \cdot d1 + \sigma w/2Ms2 \cdot d2$$

where Ms1 is the magnetization, d1 is a film thickness, and Hc1 is a coercive force of the magnetic film placed closer to the magnetic reproducing head; Ms2 is the magnetization, d2 is a film thickness, and Hc2 is a coercive force of the other magnetic film; and σw is interface magnetic domain wall energy stored at the boundary of the two magnetic films.

According to the above arrangement, the magnetization directions of the two magnetic films forming the magnetic layer are the same in the portion having approximately room temperature, and the magnetization of each magnetic film is intensified by the other. Consequently, the leaking magnetic fluxes from the reproducing portion in the magnetic layer are increased, thereby making it possible to obtain a large reproducing signal.

The magnetic reproducing method of the present invention may be a magnetic reproducing method of reproducing information from a magnetic recording medium having at least a magnetic layer including two magnetic films coupled to each other by means of exchanged interaction of magnetic materials, one of the magnetic films forming the magnetic layer being made of a ferrimagnetic material having a magnetic compensation point, magnetization directions of the two magnetic films being opposite in a portion having approximately room temperature and the same in a portion heated to a magnetically reproducible temperature during reproduction, the method comprising the step of reproducing information by heating a reproducing portion in a reproducing track in such a manner that the magnetization directions of the two magnetic films in the reproducing portion are aligned in a same direction.

According to the above arrangement, by reproducing information with heating of the track adjacent to the reproducing track in such a manner that the magnetization directions of the two magnetic films in the reproducing portion of the reproducing track become the same, the leaking magnetic fluxes (adverse effects from the magnetic films in the magnetic flux detecting portion by the magnetic reproducing head) from the track adjacent to the reproducing track and having approximately room temperature can be cancelled out completely. Thus, the magnetic reproduction can be realized while crosstalk from the track adjacent to the reproducing track is reduced significantly.

The magnetic reproducing method of the present invention may be a magnetic reproducing method of reproducing information from a magnetic recording medium having at least a magnetic layer including two magnetic films coupled to each other by means of exchanged interaction of magnetic materials, one of the magnetic films forming the magnetic layer being made of a ferrimagnetic material having a magnetic compensation point, magnetization directions of the two magnetic films being the same in a portion having approximately room temperature, and opposite in a heated portion during reproduction, the method comprising the step of reproducing information by heating a track adjacent to a reproducing portion in a reproducing track in such a manner that the magnetization directions of the two magnetic films in the track adjacent to the reproducing portion in the reproducing track are aligned in opposite directions.

According to the above arrangement, by reproducing information with heating of the reproducing track in such a manner that the magnetization directions of the two magnetic films become opposite in the track (adjacent track) adjacent to the reproducing portion in the reproducing track, the leaking magnetic fluxes (adverse effects from the magnetic films in the magnetic flux detecting portion by the magnetic reproducing head) from the heated track adjacent to the reproducing track can be cancelled out completely. Thus, the magnetic reproduction can be realized while crosstalk from the track adjacent to the reproducing track is reduced significantly.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A magnetic recording medium comprising:
   a magnetic layer which records a magnetization direction in accordance with information,
   said magnetic layer including two magnetic films,
   magnetization directions of said two magnetic films being the same in a reproducing area and opposite in areas other than said reproducing area.

2. The magnetic recording medium of claim 1, wherein a following relational expression is established in the areas other than said reproducing area:

$$Ms1 \cdot d1 \geq Ms2 \cdot d2$$

where $Ms1$ is magnetization and $d1$ is a film thickness of the magnetic film on a side where the magnetization direction is detected, and $Ms2$ is magnetization and $d2$ is a film thickness of the other magnetic film.

3. The magnetic recording medium of claim 2, wherein a following relational expression is established in the areas other than said reproducing area:

$$\sigma w/2Ms1 \cdot d1 - \sigma w/2Ms2 \cdot d2 > Hc1 + Hc2$$

where $Ms1$ is magnetization, $d1$ is a film thickness, and $Hc1$ is a coercive force of the magnetic film on a side where the magnetization direction is detected; $Ms2$ is magnetization, $d2$ is a film thickness, and $Hc2$ is a coercive force of the other magnetic film; and $\sigma w$ is interface magnetic domain wall energy stored at a boundary between said two magnetic films.

4. The magnetic recording medium of claim 2, wherein two following relational expressions are established concurrently in the areas other than said reproducing area:

$$Hc1 < \sigma w/2Ms1 \cdot d1$$

$$Hc1 + Hc2 > \sigma w/2Ms1 \cdot d1 - \sigma w/2Ms2 \cdot d2 > Hc1 - Hc2$$

where $Ms1$ is magnetization, $d1$ is a film thickness, and $Hc1$ is a coercive force of the magnetic film on a side where the magnetization direction is detected; $Ms2$ is magnetization, $d2$ is a film thickness, and $Hc2$ is a coercive force of the other magnetic film; and $\sigma w$ is interface magnetic domain wall energy stored at a boundary between said two magnetic films.

5. The magnetic recording medium of claim 2, wherein two following relational expressions are established concurrently in the areas other than said reproducing area:

$$Hc2 < \sigma w/2Ms2 \cdot d2$$

$$Hc1 - Hc2 > \sigma w/2Ms1 \cdot d1 - \sigma w/2Ms2 \cdot d2$$

where $Ms1$ is magnetization, $d1$ is a film thickness, and $Hc1$ is a coercive force of the magnetic film on a side where the magnetization direction is detected; $Ms2$ is magnetization, $d2$ is a film thickness, and $Hc2$ is a coercive force of the other magnetic film; and $\sigma w$ is interface magnetic domain wall energy stored at a boundary between said two magnetic films.

6. The magnetic recording medium of claim 4, wherein one of two following relational expressions is established in said reproducing area:

$$Hc2 - Hc1 > \sigma w/2Ms1 \cdot d1 + \sigma w/2Ms2 \cdot d2, \ (Ms1 \cdot d1 \leq Ms2 \cdot d2)$$

$$Hc1 - Hc2 > \sigma w/2Ms1 \cdot d1 + \sigma w/2Ms2 \cdot d2, \ (Ms1 \cdot d1 \geq Ms2 \cdot d2)$$

where $Ms1$ is magnetization, $d1$ is a film thickness, and $Hc1$ is a coercive force of the magnetic film on a side where the magnetization direction is detected; Ms2 is magnetization, d2 is a film thickness, and Hc2 is a coercive force of the other magnetic film; and σw is interface magnetic domain wall energy stored at a boundary between said two magnetic films.

7. The magnetic recording medium of claim 5, wherein one of two following relational expressions is established in said reproducing area:

$$Hc2-Hc1>\sigma w/2Ms1\cdot d1+\sigma w/2Ms2\cdot d2, (Ms1\cdot d1\leq Ms2\cdot d2)$$

$$Hc1-Hc2>\sigma w/2Ms1\cdot d1+\sigma w/2Ms2\cdot d2, (Ms1\cdot d124\ Ms2\cdot d2)$$

where Ms1 is magnetization, d1 is a film thickness, and Hc1 is a coercive force of the magnetic film on a side where the magnetization direction is detected; Ms2 is magnetization, d2 is a film thickness, and Hc2 is a coercive force of the other magnetic film; and σw is interface magnetic domain wall energy stored at a boundary between said two magnetic films.

8. The magnetic recording medium of claim 4, wherein a following relational expression is established in said reproducing area:

$$|Hc1-Hc2|<\sigma w/2Ms1\cdot d1+\sigma w/2Ms2\cdot d2$$

where Ms1 is magnetization, d1 is a film thickness, and Hc1 is a coercive force of the magnetic film on a side where the magnetization direction is detected; Ms2 is magnetization, d2 is a film thickness, and Hc2 is a coercive force of the other magnetic film; and σw is interface magnetic domain wall energy stored at a boundary between said two magnetic films.

9. The magnetic recording medium of claim 5, wherein a following relational expression is established in said reproducing area:

$$|Hc1-Hc2|<\sigma w/2Ms1\cdot d1+\sigma w/2Ms2\cdot d2$$

where Ms1 is magnetization, d1 is a film thickness, and Hc1 is a coercive force of the magnetic film on a side where the magnetization direction is detected; Ms2 is magnetization, d2 is a film thickness, and Hc2 is a coercive force of the other magnetic film; and σw is interface magnetic domain wall energy stored at a boundary between said two magnetic films.

10. The magnetic recording medium of claim 1, wherein one of said two magnetic films is made of a ferrimagnetic material and the other magnetic film is made of a ferromagnetic material.

11. The magnetic recording medium of claim 1, further comprising an intermediate layer, inserted between said two magnetic films, for adjusting an exchanged coupling force therebetween.

12. The magnetic recording medium of claim 11, wherein said intermediate layer weakens exchanged coupling between said two magnetic films.

13. A magnetic recording medium, from which recorded information is reproduced by a magnetic reproducing head with heating of a reproducing track, said medium comprising:

at least a magnetic layer including two magnetic films coupled to each other by means of exchanged interaction of magnetic materials, one of said two magnetic films which forms said magnetic layer being made of a ferrimagnetic material having a magnetic compensation temperature; and magnetization directions of said magnetic films being opposite in a portion having approximately room temperature and the same in a portion heated to a magnetically reproducible temperature during reproduction.

14. The magnetic recording medium of claim 13, wherein a following relational expression is established in said portion having approximately room temperature:

$$Ms1\cdot d1<Ms2\cdot d2$$

where Ms1 is magnetization and d1 is a film thickness of the magnetic film placed closer to said magnetic reproducing head, and Ms2 is magnetization and d2 is a film thickness of the other magnetic film.

15. The magnetic recording medium of claim 14, wherein two following relational expressions are established concurrently in said portion having approximately room temperature:

$$Hc2<\sigma w/2Ms2\cdot d2$$

$$Hc1-Hc2>\sigma w/2Ms1\cdot d1-\sigma w/2Ms2\cdot d2$$

where Ms1 is magnetization, d1 is a film thickness, and Hc1 is a coercive force of the magnetic film placed closer to said magnetic reproducing head; Ms2 is magnetization, d2 is a film thickness, and Hc2 is a coercive force of the other magnetic film; and σw is interface magnetic domain wall energy stored at a boundary between said two magnetic films.

16. The magnetic recording medium of claim 15, wherein one of two following relational expressions is established in said portion heated to the magnetically reproducible temperature:

$$Hc2-Hc1>\sigma w/2Ms1\cdot d1+\sigma w/2Ms2\cdot d2, (Ms1\cdot d123\ Ms2\cdot d2)$$

$$Hc1-Hc2>\sigma w/2Ms1\cdot d1+\sigma w/2Ms2\cdot d2, (Ms1\cdot d124\ Ms2\cdot d2)$$

where Ms1 is magnetization, d1 is a film thickness, and Hc1 is a coercive force of the magnetic film placed closer to said magnetic recording head; Ms2 is magnetization, d2 is a film thickness, and Hc2 is a coercive force of the other magnetic film; and σw is interface magnetic domain wall energy stored at a boundary between said two magnetic films.

17. A magnetic recording medium, from which recorded information is reproduced by a magnetic reproducing head with heating of a track adjacent to a reproducing track, said medium comprising at least a magnetic layer including two magnetic films coupled to each other by means of exchanged interaction of magnetic materials, one of said magnetic films which forms said magnetic layer being made of a ferrimagnetic material having a magnetic compensation point, magnetization directions of said two magnetic films being the same in a portion having approximately room temperature and opposite in a heated portion in said track adjacent to said reproducing track during reproduction.

18. The magnetic recording medium of claim 17, wherein a following relational expression is established in said heated portion:

$$Ms1\cdot d1<Ms2\cdot d2$$

where Ms1 is magnetization and d1 is a film thickness of the magnetic film placed closer to said magnetic reproducing head, and Ms2 is magnetization and d2 is a film thickness of the other magnetic film.

19. The magnetic recording medium of claim 18, wherein two following relational expressions are established concurrently in said heated portion:

$$Hc2 < \sigma w/2Ms2 \cdot d2$$

$$Hc1 - Hc2 > \sigma w/2Ms1 \cdot d1 - \sigma w/2Ms2 \cdot d2$$

where Ms1 is magnetization, d1 is a film thickness, and Hc1 is a coercive force of the magnetic film placed closer to said magnetic reproducing head; Ms2 is magnetization, d2 is a film thickness, and Hc2 is a coercive force of the other magnetic film; and σw is interface magnetic domain wall energy stored at a boundary between said two magnetic films.

20. The magnetic recording medium of claim 19, wherein one of two following relational expressions is established in said portion having approximately room temperature:

$$Hc2 - Hc1 > \sigma w/2Ms1 \cdot d1 + \sigma w/2Ms2 \cdot d2, \ (Ms1 \cdot d1 \leq Ms2 \cdot d2)$$

$$Hc1 - Hc2 > \sigma w/2Ms1 \cdot d1 + \sigma w/2Ms2 \cdot d2, \ (Ms1 \cdot d1 \geq Ms2 \cdot d2)$$

where Ms1 is magnetization, d1 is a film thickness, and Hc1 is a coercive force of the magnetic film placed closer to said magnetic reproducing head; Ms2 is magnetization, d2 is a film thickness, and Hc2 is a coercive force of the other magnetic film; and σw is interface magnetic domain wall energy stored at a boundary between said two magnetic films.

21. The magnetic recording medium of claim 13, wherein said magnetic layer is made of amorphous alloy composed of Fe, Co, and a rare earth element.

22. The magnetic recording medium of claim 17, wherein said magnetic layer is made of amorphous alloy composed of Fe, Co, and a rare earth element.

23. The magnetic recording medium of claim 21, wherein said rare earth element is at least one of Tb, Dy, and Gd.

24. The magnetic recording medium of claim 22, wherein said rare earth element is at least one of Tb, Dy, and Gd.

25. The magnetic recording medium of claim 13, wherein the magnetic film coupled to the magnetic film made of the ferrimagnetic material having the magnetic compensation temperature by means of exchanged coupling is a film selected from a ferromagnetic perpendicular magnetization film containing Co and Cr, and an multi-layered perpendicular magnetization film composed of one of a combination of Co and Pt and a combination of Co and Pd.

26. The magnetic recording medium of claim 13, wherein the magnetization directions of said two magnetic films are opposite and adverse effects of leaking magnetic fluxes therefrom are cancelled out with each other in a temperature range between room temperature and 100° C., and information is magnetically reproduced in a temperature range between 120° C. and 200° C.

27. The magnetic recording medium of claim 17, wherein said heated portion in said track adjacent to said reproducing track has a temperature in a range between 120° C. and 200° C., and adverse effects of leaking magnetic fluxes from said two magnetic films are cancelled out with each other in said range.

28. A magnetic reproducing method of a magnetic recording medium having a magnetic layer including two magnetic films, comprising the steps of:

(a) aligning magnetization directions of said two magnetic films in a same direction in a reproducing area; and (b) aligning magnetization directions of said two magnetic films in opposite directions in areas other than said reproducing area.

29. A magnetic reproducing method of reproducing information from a magnetic recording medium having at least a magnetic layer including two magnetic films coupled to each other by means of exchanged interaction of magnetic materials, one of said magnetic films which forms said magnetic layer being made of a ferrimagnetic material having a magnetic compensation point, magnetization directions of said two magnetic films being opposite in a portion having approximately room temperature, and the same in a portion heated to a magnetically reproducible temperature during reproduction, said method comprising the step of reproducing information by heating a reproducing portion in a reproducing track in such a manner that the magnetization directions of said two magnetic films in said reproducing portion are aligned in a same direction.

30. A magnetic reproducing method of reproducing information from a magnetic recording medium having at least a magnetic layer including two magnetic films coupled to each other by means of exchanged interaction of magnetic materials, one of said magnetic films which forms said magnetic layer being made of a ferrimagnetic material having a magnetic compensation point, magnetization directions of said two magnetic films being the same in a portion having approximately room temperature, and opposite in a heated portion during reproduction, said method comprising the step of reproducing information by heating a track adjacent to a reproducing portion in a reproducing track in such a manner that the magnetization directions of said two magnetic films in said track adjacent to said reproducing portion in said reproducing track are aligned in opposite directions.

* * * * *